(12) United States Patent
Piazza Galarza et al.

(10) Patent No.: US 11,146,133 B2
(45) Date of Patent: Oct. 12, 2021

(54) ELECTRIC MACHINE WITH ROTOR COOLANT AND LUBRICATION DISTRIBUTION SYSTEM, AND SYSTEMS AND METHODS OF COOLING AND LUBRICATING AN ELECTRIC MACHINE

(71) Applicant: General Electric Company, Schenectady, NY (US)

(72) Inventors: Pablo Gabriel Piazza Galarza, Cincinnati, OH (US); Fabian Isaza, Cincinnati, OH (US); Duane Howard Anstead, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 16/117,158

(22) Filed: Aug. 30, 2018

(65) Prior Publication Data
US 2020/0076257 A1    Mar. 5, 2020

(51) Int. Cl.
H02K 1/32     (2006.01)
H02K 7/14     (2006.01)
H02K 9/19     (2006.01)

(52) U.S. Cl.
CPC .............. H02K 1/32 (2013.01); H02K 7/14 (2013.01); H02K 9/19 (2013.01)

(58) Field of Classification Search
CPC .. H02K 9/19; H02K 1/32; H02K 7/14; H02K 9/197
See application file for complete search history.

(56) References Cited

U.S. PATENT DOCUMENTS 2,330,121 A * 9/1943 Heintz .................. H02K 9/20
                                                            310/52
2,659,530 A    11/1953 Garnier et al.
(Continued)

FOREIGN PATENT DOCUMENTS

DE         19810437 A1    3/1999
DE    102015218519 A1    9/2016
(Continued)

OTHER PUBLICATIONS

European Search Report Corresponding to Application No. 19192649 dated Jan. 30, 2020.
(Continued)

Primary Examiner — Naishadh N Desai
(74) Attorney, Agent, or Firm — Dority & Manning, P.A.

(57) ABSTRACT

An electric machine may include a rotor shaft that has a hollow region configured to receive a coolant. The hollow region is defined by an inner surface which has a slope that increases from a first inner diameter at a first end to a second inner diameter at a second end. Centrifugal force generated when rotating the rotor shaft causes the coolant to flow across the inner surface of the rotor shaft from the first end to the second end at a velocity depending at least in part on the slope of the inner surface of the rotor shaft. A method of cooling an electric machine includes injecting a coolant into a first end of the hollow region of the rotor shaft, rotating the rotor shaft at an operational rate of rotation, with the rotation generating centrifugal force that causes the coolant to flow from the first end to the second end, transferring heat from the rotor shaft to the coolant.

20 Claims, 17 Drawing Sheets

(56) References Cited

U.S. PATENT DOCUMENTS

| | | | |
|---|---|---|---|
| 4,045,696 A * | 8/1977 | Lutz | H02K 37/02 310/49.43 |
| 4,152,570 A * | 5/1979 | Inoue | B23H 7/28 204/224 M |
| 4,251,186 A | 2/1981 | Chomel et al. | |
| 4,280,071 A | 7/1981 | Eckels | |
| 4,669,999 A | 6/1987 | Miller | |
| 4,714,139 A | 12/1987 | Lorenz et al. | |
| 5,293,089 A | 3/1994 | Frister | |
| 5,332,369 A | 7/1994 | Jensen | |
| 5,818,131 A | 10/1998 | Zhang | |
| 5,834,862 A * | 11/1998 | Hartzell, Jr. | H02K 41/0356 310/12.29 |
| 6,102,674 A | 8/2000 | Strauch et al. | |
| 6,191,511 B1 * | 2/2001 | Zysset | H02K 9/19 310/53 |
| 6,329,731 B1 | 12/2001 | Arbanas et al. | |
| 6,750,572 B2 | 6/2004 | Tornquist et al. | |
| 7,021,905 B2 | 4/2006 | Torrey et al. | |
| 7,345,399 B2 * | 3/2008 | Baempfer | F02M 37/08 310/156.17 |
| 7,489,057 B2 | 2/2009 | Zhou et al. | |
| 7,579,725 B2 | 8/2009 | Zhou et al. | |
| 7,646,119 B2 * | 1/2010 | Schmidt | H02K 15/024 310/61 |
| 7,825,552 B2 * | 11/2010 | Husband | H02K 1/325 310/59 |
| 8,616,834 B2 | 12/2013 | Knight, III et al. | |
| 9,252,642 B2 | 2/2016 | Buttner et al. | |
| 9,353,848 B2 | 5/2016 | Blewett et al. | |
| 9,762,106 B2 | 9/2017 | Gauthier et al. | |
| 2002/0195887 A1 * | 12/2002 | Kobayashi | H02K 9/19 310/61 |
| 2010/0289386 A1 | 11/2010 | Gerstler et al. | |
| 2011/0074233 A1 | 3/2011 | Okada et al. | |
| 2012/0104884 A1 | 5/2012 | Wagner et al. | |
| 2012/0220379 A1 | 8/2012 | Murakami | |
| 2013/0002064 A1 | 1/2013 | De Bock et al. | |
| 2013/0119830 A1 * | 5/2013 | Hautz | H02K 9/005 310/60 R |
| 2013/0270931 A1 * | 10/2013 | Handa | H02K 1/32 310/43 |
| 2015/0288255 A1 * | 10/2015 | Barker | H02K 9/197 310/43 |
| 2016/0047395 A1 | 2/2016 | Zhang et al. | |
| 2016/0149451 A1 | 5/2016 | Teter et al. | |
| 2017/0184024 A1 | 6/2017 | Sennoun | |
| 2017/0346371 A1 * | 11/2017 | Gruetzner | H02K 1/32 |

FOREIGN PATENT DOCUMENTS

| | | |
|---|---|---|
| EP | 2299564 A1 | 3/2011 |
| GB | 858521 A | 1/1961 |
| JP | 2006/300101 A | 11/2006 |

OTHER PUBLICATIONS

European Office Action Corresponding to Application No. 19192649 dated Nov. 10, 2020.

* cited by examiner

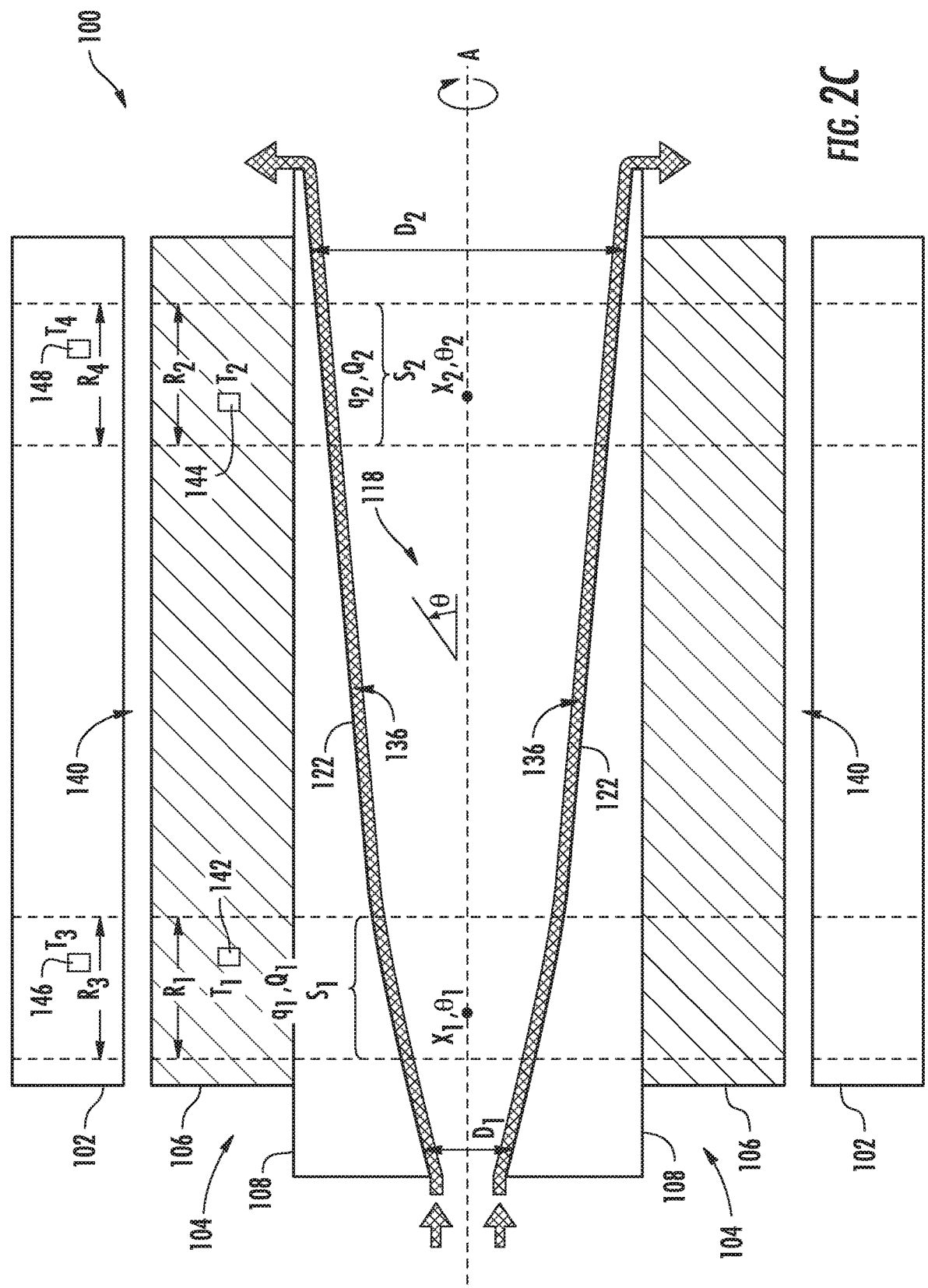

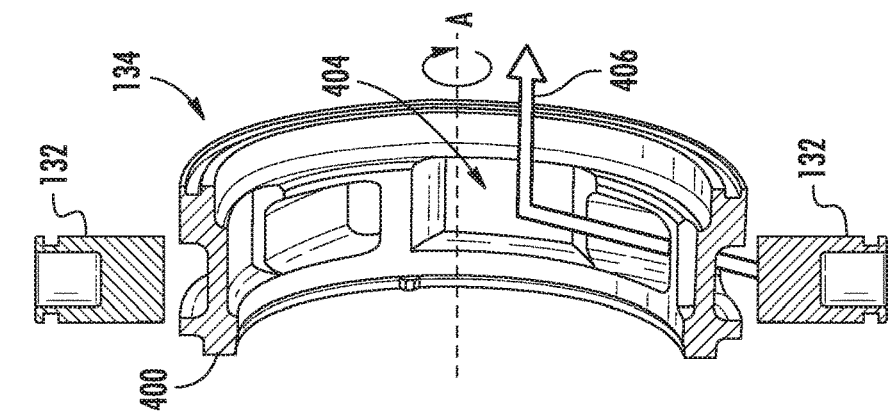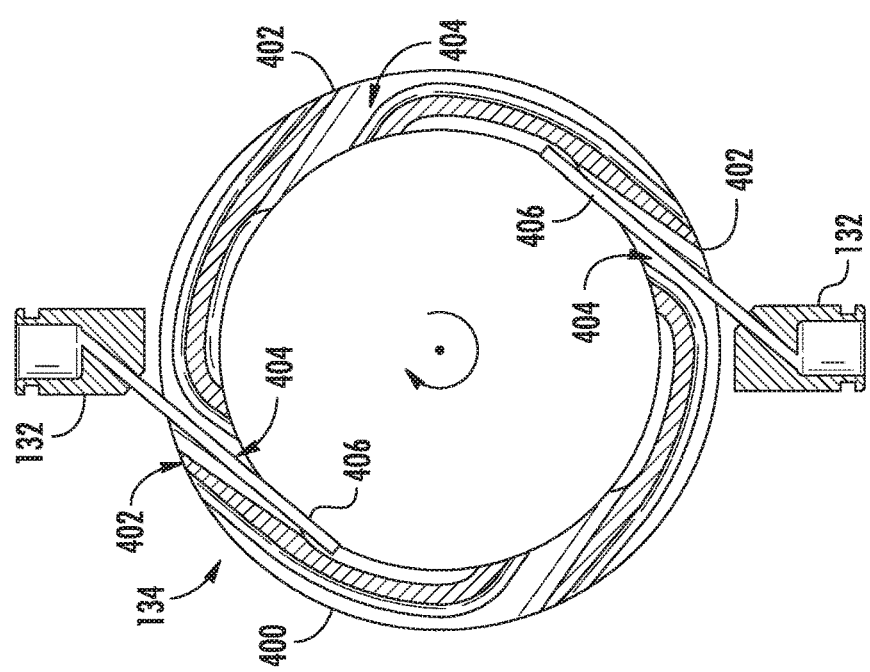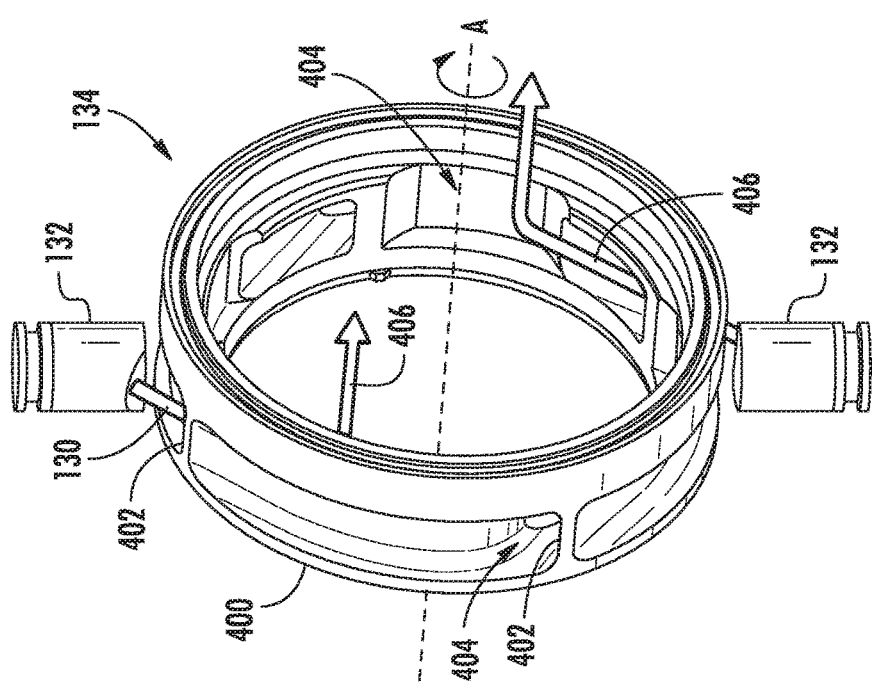

ELECTRIC MACHINE WITH ROTOR COOLANT AND LUBRICATION DISTRIBUTION SYSTEM, AND SYSTEMS AND METHODS OF COOLING AND LUBRICATING AN ELECTRIC MACHINE

FIELD

The present disclosure relates to electric machines with rotor coolant and lubrication distribution systems, and related systems and methods of cooling and lubricating an electric machine.

BACKGROUND

Electric machines are used in a wide variety of settings, including industrial, commercial, and consumer applications. In any setting, an electric machine may generate a considerable amount of heat through a number of different pathways. For example, heat is typically generated in an electric machine through electric resistance in electric current flowing through a rotor and/or stator, hysteresis losses due to changing magnetic fields, and resistive heating due to the eddy currents generated by magnetic fields. Additionally, friction in an electric machine's moving components also typically generate heat, requiring lubrication.

The heat generated by an electric machine may contribute to inefficiencies, malfunction, and failures if not properly managed. Electric machines typically have some form of cooling system to manage heat loads. Some cooling systems seek to distribute a coolant close to the heat source by providing cooling mechanisms that are inserted inside a rotor shaft or that surround a stator. These mechanisms, however, add weight and complexity, cause windage losses, and introduce the potential for rubbing with the rotor. Additionally, these mechanisms may themselves accumulate heat that impedes the performance of the cooling system and consequently the performance of the electric machine.

High performance applications require electric machines with a high power density, as the marketplace demands electric machines with larger power outputs and yet smaller machine sizes. The combination of larger power outputs and smaller machine sizes found in high power density electric machines gives rise to very demanding cooling requirements. Some cooling systems provide uneven cooling across various portions of a rotor, which can lead to rotor and/or rotor shaft warping of due to local temperature differences, as well as increased potential for rubbing between the rotor and stator. Additionally, if an electric machine is not sufficiently cooled, the temperature of the rotor, stator, or other components can exceed temperature limitations, leading to critical failures.

Accordingly, there exists a need for electric machines with improved cooling and lubrication distribution systems, and for systems and methods of cooling and lubricating electric machines.

BRIEF DESCRIPTION

Aspects and advantages will be set forth in part in the following description, or may be obvious from the description, or may be learned through practicing the presently disclosed subject matter.

In one aspect, the present disclose embraces electric machines. An exemplary electric machine includes a stator, a rotor, and a rotor shaft operably coupled to the rotor. The rotor shaft includes a hollow region configured to relieve a coolant. The hollow region is defined by an inner surface that has a slope that increases from a first inner diameter at a first end to a second inner diameter at a second end. A force that includes a centrifugal force generated when rotating the rotor shaft at an operating rate of rotation causes the coolant to flow across the inner surface of the rotor shaft from the first end to the second end at a velocity depending at least in part on the slope of the inner surface of the rotor shaft.

In another aspect, the present disclosure embraces a method of cooling an electric machine. An exemplary method includes injecting a coolant into a first end of a hollow region of a rotor shaft of an electric machine in which the rotor shaft includes an inner surface which has a slope that increases from a first inner diameter at a first end to a second inner diameter at a second end. The slope may include a frustoconical or sloped profile and/or a stepped profile. The exemplary method further includes rotating the rotor shaft at an operational rate of rotation, with the rotating generating a force that includes centrifugal force acting upon the coolant in the rotor shaft. The force causes the coolant to flow across the inner surface of the rotor shaft from the first end to the second end. The exemplary method further includes transferring heat from the rotor shaft to the coolant flowing across the inner surface of the rotor shaft.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 2A-2E schematically show cross-sectional perspective views of various exemplary embodiments of a liquid cooled rotor shaft;

FIGS. 4A-4C schematically show a perspective view, a cross-sectional view, and a cutaway perspective view, respectively, of an exemplary impeller that may be operably coupled to a rotor shaft for supplying a coolant to the rotor shaft;

Figure 1:
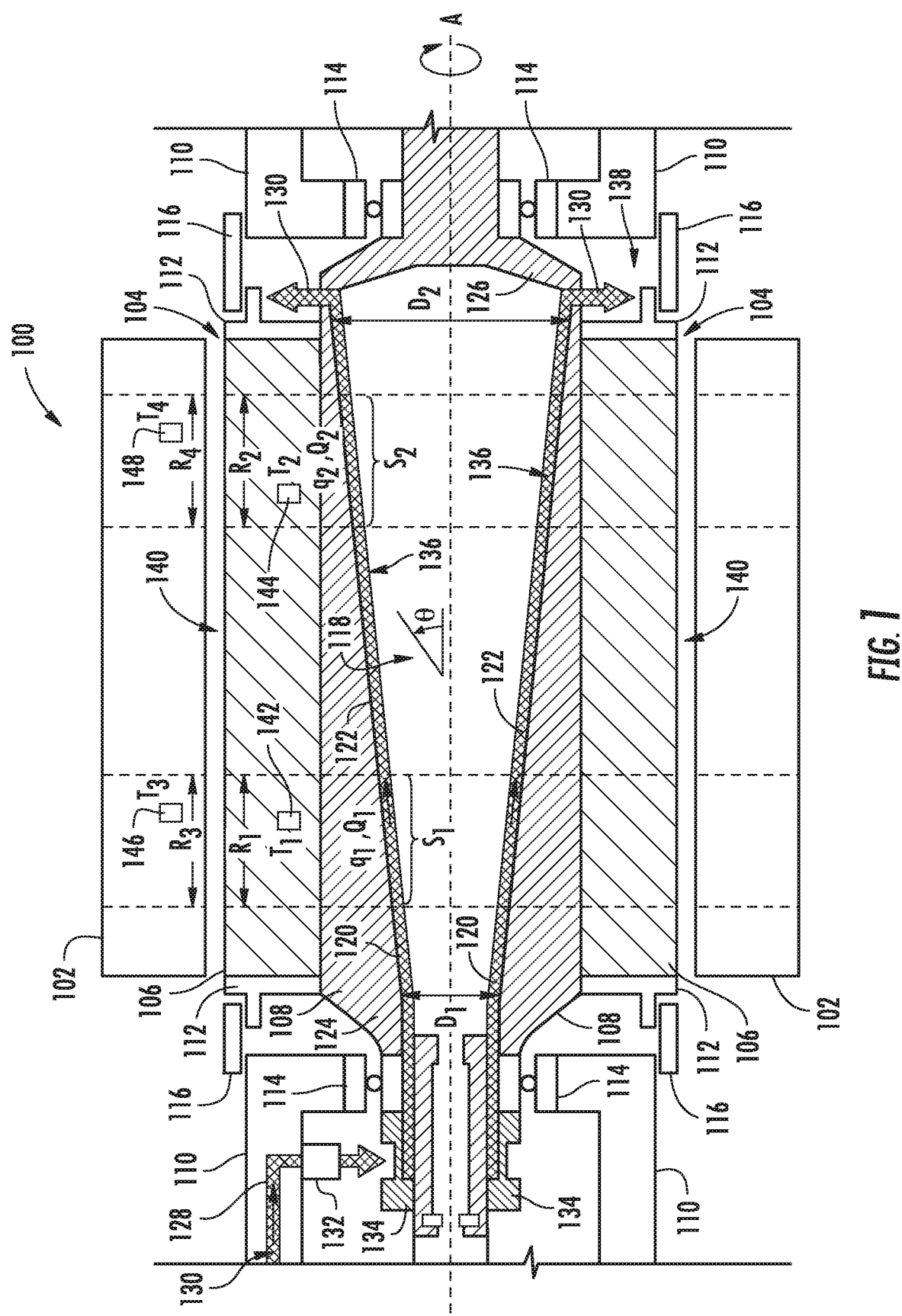
FIG. 1 schematically shows a cross-sectional perspective view of an exemplary electric machine with a liquid cooled rotor shaft.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

The present disclosure generally provides electric machines with improved rotor coolant and lubrication distribution systems, and improved methods of cooling and lubricating an electric machine. The presently disclosed rotor coolant and lubrication distribution systems include one or more of a rotor shaft with a sloped inner surface that utilizes centrifugal force to cause coolant to flow across an inner surface of the rotor shaft, an impeller mounted on a rotor shaft to distribute coolant to an inner surface of the rotor shaft, and/or a rotor cooling conduit integrally formed within the body of a rotor shaft. These features, among others, may be included in an electric machine individually or in combination.

An electric machine configured according to the present disclosure may exhibit an improved power density through improved cooling efficiency, and/or through weight savings from the elimination of cooling mechanisms or other componentry found in previous electric machines for distributing a coolant. The presently disclosed rotor coolant and lubrication systems may provide substantially uniform cooling across a longitudinal length of a rotor shaft, thereby providing a substantially uniform temperature distribution and/or a substantially uniform width of the air gap across a longitudinal length of the rotor shaft. Such substantially uniform temperature distribution and/or substantially uniform width of the air gap reduce the potential for rotor warping and rubbing, among other things. The width of the air gap may be ascertained using any desired method known in the art. Additionally, the presently disclosed electric machines may exhibit reduced windage losses, simplified assembly and maintenance, and reduced potential for downtime caused by damaged or worn componentry. In some embodiments the presently disclosed rotor coolant and lubrication distribution systems may allow for more compact, lighter-weight electric machines, further improving power density and operating efficiency.

An electric machine may function as an electric motor and/or an electric generator. An electric motor converts electrical energy into mechanical energy. An electric generator converts mechanical energy into electrical energy. Some examples where an electric machine may be utilized include aircraft, marine vessels, motor vehicles, power generation facilities, manufacturing facilities, industrial machinery, and the like. In the context of an aircraft, an electric machine may be used to supply power to a turbomachine engine, such as a turbofan engine in an aircraft. The power from the electric machine may be used to start the turbomachine engine, or to provide propulsive thrust to the aircraft, including commercial, military, or civilian aircraft, as well as unmanned aircraft such as unmanned aerial vehicles, electric rotorcraft, drones, and the like. In the context of a generator, an electric machine may be used to supply electrical power to auxiliary systems, including auxiliary systems in an aircraft. In some embodiments, and electric machine may function as both an electric motor and as a generator during different operating states. For example, an electric machine may function as an electric motor to start an aircraft engine, and as a generator to supply electric power to systems in the aircraft.

It will be appreciated that an electric machine may be used in numerus other settings, and it is intended that the presently disclosed rotor coolant and lubrication distribution systems may be implemented in an electric machine in any setting without departing from the scope or spirit of the present disclosure.

Various embodiments of the present disclosure will now be described in greater detail. Referring to FIG. 1, an exemplary electric machine 100 is shown. The electric machine 100 includes a stator assembly 102 and a rotor assembly 104. The rotor assembly 104 includes a rotor core 106 and a rotor shaft 108 operably coupled to the rotor core 106. In some embodiments, for example, the rotor core 106 may be operably coupled to the rotor shaft 108 via an interference fit, a shrink fit, a press fit, or any other suitable fit known in the art. In some embodiments, the rotor core 106 may include a plurality of laminations (not shown) stacked annularly along the longitudinal axis A of the rotor shaft 108. A plurality of magnets (e.g. permanent magnets) may be secured in channels formed within the laminations, and end-caps 112 may be provided to secure the laminations and magnets as stacked.

The rotor shaft 108 may be coupled to a housing assembly 110 with one or more bearing assemblies 114. A plurality of coolant seals 116 may provide a seal between the rotor assembly 104 and the housing assembly 110. During operation of the electric machine 100, the rotor assembly 104 rotates about a longitudinal axis A under force provided by a magnetic field generated by an electric power source (in the case of an electric motor) or under force provided by a mechanical power source (in the case of a generator).

The rotor shaft 108 includes a hollow region 118 defined by an inner surface 120. At least a portion of the inner surface 120 may have a sloped inner surface 122 with a slope θ that extends across at least a portion of the longitudinal length of the rotor shaft 108 from a first inner diameter $D_1$ at a first end 124 of the rotor shaft 108 to a second inner diameter $D_2$ at a second end 126 of the rotor shaft 108. The sloped inner surface 122 may encompass all or part of the hollow region 118 of the rotor shaft 108. The inner surface 120 may include one or more of a number of configurations, non-exhaustive examples of which are described with respect to FIGS. 2A-2F.

The electric machine includes a cooling conduit 128 that defines a pathway for circulating a coolant 130. In some embodiments, as shown in FIG. 1, the cooling conduit 128 delivers coolant 130 to a nozzle 132, and the nozzle 132 injects the coolant 130 into an impeller 134. As shown, the impeller 134 receives a radial stream of coolant 130 from the nozzle 132; however the impeller 134 also may be configured to receive an axial stream of coolant 130, as well as a stream of coolant 130 with any other orientation. The impeller 134 directs the stream of coolant 130 into the first end 124 of the rotor shaft 108. For example, as shown in FIG. 1, the impeller 134 may direct the radial stream of coolant axially into the rotor shaft 108. The coolant 130 may take the form of a film 136 on the inner surface 120 of the rotor shaft 108. The coolant 130 flows across the inner surface 120 of the rotor shaft 108 at least in part under centrifugal force generated by rotation of the rotor shaft 108. A film 136 of coolant 130 may cover all or a portion of the inner surface 120 of the rotor shaft 108. The thickness of the film 136 may depend on one or more of the slope θ of the inner surface of the rotor shaft 108, the flow rate of coolant 130, the rotating speed of the rotor shaft 108, and/or the viscosity of the coolant. Additionally, in some embodiments the thickness of the film 136 may depend on the presence or absence of surface features on the rotor shaft 108, and the configuration thereof. Such surface features may include coolant dams, ridges, grooves, bumps, dimples, and the like, non-exhaustive examples of which are as described with reference to FIGS. 3A-3H.

The flow of coolant 130 across the inner surface 120 of the rotor shaft 108 includes an axial component, and may also include a radial component. Surface features may be provided to augment the flow of coolant 130 and/or the thickness of the film 136 of coolant 130. For example, surface features may alter the direction of coolant flow, and/or induce turbulence in the coolant. Coolant 130 discharging from the second end 126 of the rotor shaft 108 may accumulate in a sump area 138. Coolant 130 accumulating in the sump area 138 may be circulated through a coolant circulation system as described with respect to FIG. 9. The coolant circulation system includes the cooling conduit 128 and the inner surface 120 of the rotor shaft 108. In some embodiments, the cooling conduit 128 may define a pathway from the second end 126 of the rotor shaft 108 through or around at least a portion of the housing assembly 110 and back to the first end 124 of the rotor shaft 108. Alternatively, or in addition, the cooling conduit 128 may define a pathway to one or more components of a coolant circulation system as described herein with reference to FIG. 9.

With the rotor shaft 108 rotating at an operating rate of rotation, a force that includes a centrifugal force caused by rotation of the rotor shaft 108 acts upon the coolant 130. The centrifugal force overcomes the force of gravity as the rate of rotation increases, causing the coolant 130 to cling to the inner surface 120 of the rotor shaft 108, forming a film of coolant 130 that covers at least a portion of the inner surface 120 of the rotor shaft 108. The force acting upon the coolant 130 may additionally include other vector components, including a slope vector corresponding to the slope θ of the inner surface 120 of the rotor shaft 108. The force causes the coolant 130 to flow across the inner surface 120 of the rotor shaft 108. The thickness of the film 136 and/or the velocity of the coolant 130 flowing across the inner surface 120 of the rotor shaft 108 may depend at least in part on the slope θ of the inner surface 120 of the rotor shaft 108 and/or the rotating speed of the rotor shaft 108.

The slope θ of the inner surface 120 of the rotor shaft 108 may range from 0° to 90° relative to a longitudinal axis A of the rotor shaft 108. A slope of 0° corresponds to a cylindrical profile of the inner surface 120 of the rotor shaft 108. A slope greater than 0° and less than 90° corresponds to a frustoconical or sloped profile of the inner surface 120 of the rotor shaft 108. A slope of 90° corresponds to a perpendicular stepped profile transitioning from one region to another of the inner surface 120 of the rotor shaft 108. A sloped inner surface 122 of the rotor shaft 108 may have a slope θ that ranges from greater than 0° to less than 90°. For example, the slope θ may range from 0.1° to 60°, such as from 1° to 60°, such as from 1° to 5°, such as from 1° to 15°, such as from 5° to 10°, such as from 10° to 25°, such as from 25° to 45°, or such as from 45° to 60°. The slope θ may be at least 0.1°, such as at least 1°, such as at least 5°, such as at least 10°, such as at least 15°, such as at least 20°, such as at least 30°, such as at least 40°, such as at least 50°, or such as at least 60°. The slope θ may be less than 90°, such as less than 60°, such as less than 50°, such as less than 40°, such as less than 30°, such as less than 20°, such as less than 15°, such as less than 10°, such as less than 5°, or such as less than 1°.

In some embodiments, the thickness of the film 136 of coolant 130 may be between 1 to 100 mils, such as from 1 to 50 mils, such as from 5 to 50 mils, such as from 10 to 50 mils, such as from 20 to 50 mils, such as from 5 to 25 mils, such as from 25 to 50 mils, such as from 25 to 75 mils, such as from 50 to 100 mils, such as from 75 to 100 mils. The thickness of the film may be at least 1 mil, such as at least 5 mils, such as at least 10 mils, such as at least 25 mils, such as at least 35 mils, such as at least 50 mils, such as at least 75 mils. The thickness of the film may be less than 100 mils, such as less than 75 mils, such as less than 50 mils, such as less than 25 mils, such as less than 15 mils, such as less than 5 mils.

The inner surface of the rotor shaft has a thermally conductive relationship with at least a portion of the rotor shaft, and at least a portion of the rotor shaft has a thermally conductive relationship with at least a portion of the rotor core 106. During operation, heat energy Q generated by the electric machine 100 transfers to the coolant flowing across the inner surface 120 of the rotor shaft 108. For example, heat energy Q transfers from the rotor shaft 108 and/or the rotor core 106 to the coolant 130 flowing across the inner surface 120 of the rotor shaft 108 by thermal conduction. The coolant 130 exits the rotor shaft 108 having been heated by the thermally conductive relationship with the rotor shaft 108. The coolant 130 exiting the rotor shaft 108 may flow into a sump area 138 (FIG. 1) and/or into a cooling conduit 128 as described below with respect to FIG. 9.

The electric machine 100 may utilize any desired coolant, such as cooling oil or other fluids. Exemplary coolants include deionized water, propylene glycol, ethylene glycol, polyalkylene glycol, betaine, and oils (e.g., jet oils, hydrocarbons, mineral oil, castor oil, silicone oils, fluorocarbon oils, transformer oils).

The electric machine 100 includes an air gap 140 defined by an annular space between the outer surface of the rotor core 106 and the inner surface of the stator 102. The air gap 140 includes a width component, spanning between the outer surface of the rotor core 106 and the inner surface of the stator 102, which may vary from time-to-time and from region-to-region, for example, with changes in the temperature of the rotor assembly 104 (i.e., the rotor core 106 and/or the rotor shaft 108) and/or changes in the temperature of the stator 102. The temperature of the rotor assembly 104 and/or of the stator 102 may be measured using one or more rotor temperature sensors. For example, as shown, an electric machine 100 may include a first rotor temperature sensor 142 and a second rotor temperature sensor 144 each selectively located at a position so as to measure a local temperature of the rotor assembly 104 (e.g., of the rotor core 106 and/or of the rotor shaft 108). The first rotor temperature sensor 142 may be selectively located to measure a first local temperature $T_1$ at a first region $R_1$ of the rotor assembly 104 (e.g., of the rotor core 106 and/or of the rotor shaft 108) and the second rotor temperature sensor 144 may be selectively located to measure a second local temperature $T_2$ at a second region $R_2$ of the rotor assembly 104 (e.g., of the rotor core 106 and/or of the rotor shaft 108).

An electric machine 100 may additionally include a third stator temperature sensor 146 and a fourth stator temperature sensor 148 each selectively located at a position so as to measure a local temperature of the stator 102. The third stator temperature sensor 146 may be selectively located to measure a third local temperature $T_3$ at a third region $R_3$ of the stator 102 and the fourth stator temperature sensor 148 may be selectively located to measure a fourth local temperature $T_4$ at a fourth region $R_4$ of the stator 102. Any desired temperature sensor may be used, including a thermistor (e.g., a positive temperature coefficient thermistor) or a non-contact temperature sensor (e.g., an infrared temperature sensor).

In some embodiments, the slope θ of the inner surface 120 of the rotor shaft 108 may be selected to provide a substantially uniform temperature and/or a substantially uniform width of the air gap 140 across a longitudinal length of the rotor shaft 108 and/or rotor core 106 (e.g., as between the first region $R_1$ and the second region $R_2$). During operation, the temperature T of the rotor shaft 108 and/or rotor core 106 depends at least in part on the quantity of heat energy Q transferred from the inner surface 120 of the rotor shaft to the coolant 130. Likewise, the first temperature $T_1$ of the first region $R_1$ of the rotor shaft 108 and/or rotor core 106 depends at least in part on a first quantity of heat energy $Q_1$ transferred from the inner surface 120 of the rotor shaft 108 to the coolant 130 across a first annular surface area $S_1$ corresponding to the first region $R_1$. The second temperature $T_2$ of a second region $R_2$ of the rotor shaft 108 and/or rotor core 106 depends at least in part on a second quantity of heat energy $Q_2$ transferred from the inner surface 120 of the rotor shaft to the coolant 130 across a second annular surface area $S_2$ corresponding to the second region $R_2$. A difference between the first temperature $T_1$ of the first region $R_1$ and the second temperature $T_2$ of the second region $R_2$ may lead to a difference in the width of the air gap 140 as between the first region $R_1$ and the second region $R_2$ due to differences in thermal expansion. Such a difference in temperature and/or air gap 140 width may lead to a warped rotor shaft 108 and/or rotor core 106, rubbing between the rotor core 106 and the stator 102, windage losses, and other inefficiencies, malfunction, or failures.

Such a difference between the first temperature $T_1$ of a first region $R_1$ and the second temperature $T_2$ of the second region $R_2$ (and/or a difference in air gap 140 width as between the first region $R_1$ and the second region $R_2$) may arise from a difference in the quantity of heat energy Q generated in or transferring to the respective regions $R_1$ and $R_2$. Additionally, or in the alternative, such a difference between the temperature $T_1$ of a first region $R_1$ and the temperature $T_2$ of the second region $R_2$ (and/or a difference in air gap 140 width as between the first region $R_1$ and the second region $R_2$) may arise from a difference between in the quantity of heat energy Q transferred from the respective regions $R_1$ and $R_2$. However, in some embodiments, the slope θ of the inner surface 120 of the rotor shaft 108 may be selected so as to at least partially offset an expected change in the rate of heat transfer per unit area q due to an increasing temperature of the coolant 130 across the longitudinal length of the rotor shaft 108 with a proportional change in the annular surface area of the inner surface of the rotor shaft 108. Under certain operating conditions, the offset obtained by the selected slope θ may provide for a substantially uniform quantity of heat energy Q transferring from the inner surface 120 of the rotor shaft 108 to the coolant 130 across a given length of the longitudinal axis of the rotor shaft 108 as between the first annular surface area $S_1$ and the second annular surface area $S_2$.

For purposes of the present disclosure, such a substantially uniform quantity of heat energy Q transferring will be said to exist under the following condition: Area_$S_1$/Area_$S_2$=q_$S_1$/q_$S_2$, where Area_$S_1$ is the area of the first annular surface area $S_1$ and Area_$S_2$ is the area of the second annular surface area $S_2$ for the given length of the longitudinal axis of the rotor shaft 108, and q_$S_1$ is the rate of heat transfer q for the first annular surface area $S_1$, and q_$S_2$ is the rate of heat transfer q for the second annular surface area $S_2$.

The rates of heat transfer may be ascertained from Fourier's law using known thermal conductivity values and known temperature gradients between the inner surface 120 of the rotor shaft 108 and the coolant 130 at various points along the longitudinal axis of the rotor shaft, which temperature gradients may be ascertained using any desired method known in the art.

The rate of heat transfer per unit area q from the inner surface 120 of the rotor shaft 108 to the coolant 130 is inversely proportional to the temperature difference between the coolant 130 and the inner surface 120 of the rotor shaft 108. The temperature of the coolant 130 increases as the coolant 130 flows across the inner surface 120 of the rotor shaft 108 and heat energy Q transfers to the coolant 130, thereby decreasing the rate of heat transfer per unit area q. As such, during operation of the electric machine 100, the first annular surface area $S_1$ may exhibit a first rate of heat transfer $q_1$ and the second annular surface area $S_2$ may exhibit a second rate of heat transfer $q_2$ as heat energy Q transfers to the coolant 130, such that the first rate of heat transfer $q_1$ exceeds the second rate of heat transfer $q_2$. However, the sloped inner surface of the rotor shaft 122 provides an increasingly larger annular surface area for a given region of the rotor shaft. An increase in the temperature of the coolant 130 and corresponding change to the rate of heat transfer per unit area q across the longitudinal length of the rotor shaft 108 may be at least partly offset by selectively providing a sloped inner surface 122 of the rotor shaft having a selected slope θ. Similarly, a difference between the quantity of heat energy Q generated in or transferring to the respective regions $R_1$ and $R_2$ may be at least partially offset by selectively providing a sloped inner surface 122 of the rotor shaft having a selected slope θ. In some embodiments, the width of the air gap 140 as between the first region $R_1$ and the second region $R_2$ may be at least partially equalized by selectively providing a sloped inner surface 122 of the rotor shaft having a selected slope θ.

In some embodiments, the slope θ of the inner surface 120 of the rotor shaft 108 may be selected so as to maintain a substantially uniform temperature as between the temperature $T_1$ of the first region $R_1$ and the temperature $T_2$ of the second region $R_2$. For example, the slope θ of the inner surface 120 of the rotor shaft 108 may be selected so as to selectively increase the annular surface area from a first annular surface area $S_1$ corresponding to a first region $R_1$ to a second annular surface area $S_2$ corresponding to a second region $R_2$. Further in addition or in the alternative, the slope θ of the inner surface 120 of the rotor shaft 108 may be selected so as to maintain a substantially uniform width of the air gap 140 as between the first region $R_1$ and the second region $R_2$. The selected slope θ may be uniform or variable. The slope θ may be selected at least in part to offset an increasing temperature of the coolant 130 across a longitudinal length of the rotor shaft and/or to at least partially offset a difference between the amounts of heat energy Q generated in and/or transferring to respective regions of the rotor shaft.

Now referring to FIGS. 2A-2D, various exemplary configurations of a rotor shaft 108 will be discussed. The examples are provided by way of explanation and should not be interpreted as limiting the present disclosure. As shown, an exemplary rotor shaft 108 includes a hollow region 118 defined by an inner surface 120. The hollow region 118 of the rotor shaft 108 extends across at least a portion of the longitudinal length of the rotor shaft 108, including up to the entire longitudinal length of the rotor shaft 108. The hollow region 118 of the rotor shaft 108 may include one or more sloped inner surfaces 122. A sloped inner surface 122 of the rotor shaft 108 may include up to the entire longitudinal length of the hollow region 118. The sloped inner surface 122 extends across at least a portion of the longitudinal length of the rotor shaft from a first inner diameter $D_1$ at a first end 124 of the rotor shaft 108 to a second inner diameter $D_2$ at a second end 126 of the rotor shaft 108. The difference between the first inner diameter $D_1$ and the second inner diameter $D_2$ define the slope θ of the inner surface 120. The inner surface 120 may have a slope θ with any desired profile, including a frustoconical or sloped profile and/or a stepped profile.

The slope θ of the inner surface 120 may be linear or nonlinear. For example, the slope θ of the inner surface 120 may remain constant across at least a portion of the longitudinal length of the hollow region 118, or the slope θ may exhibit an increasing or decreasing rate of change across at least a portion of the longitudinal length of the hollow region 118.

Figure 2A:
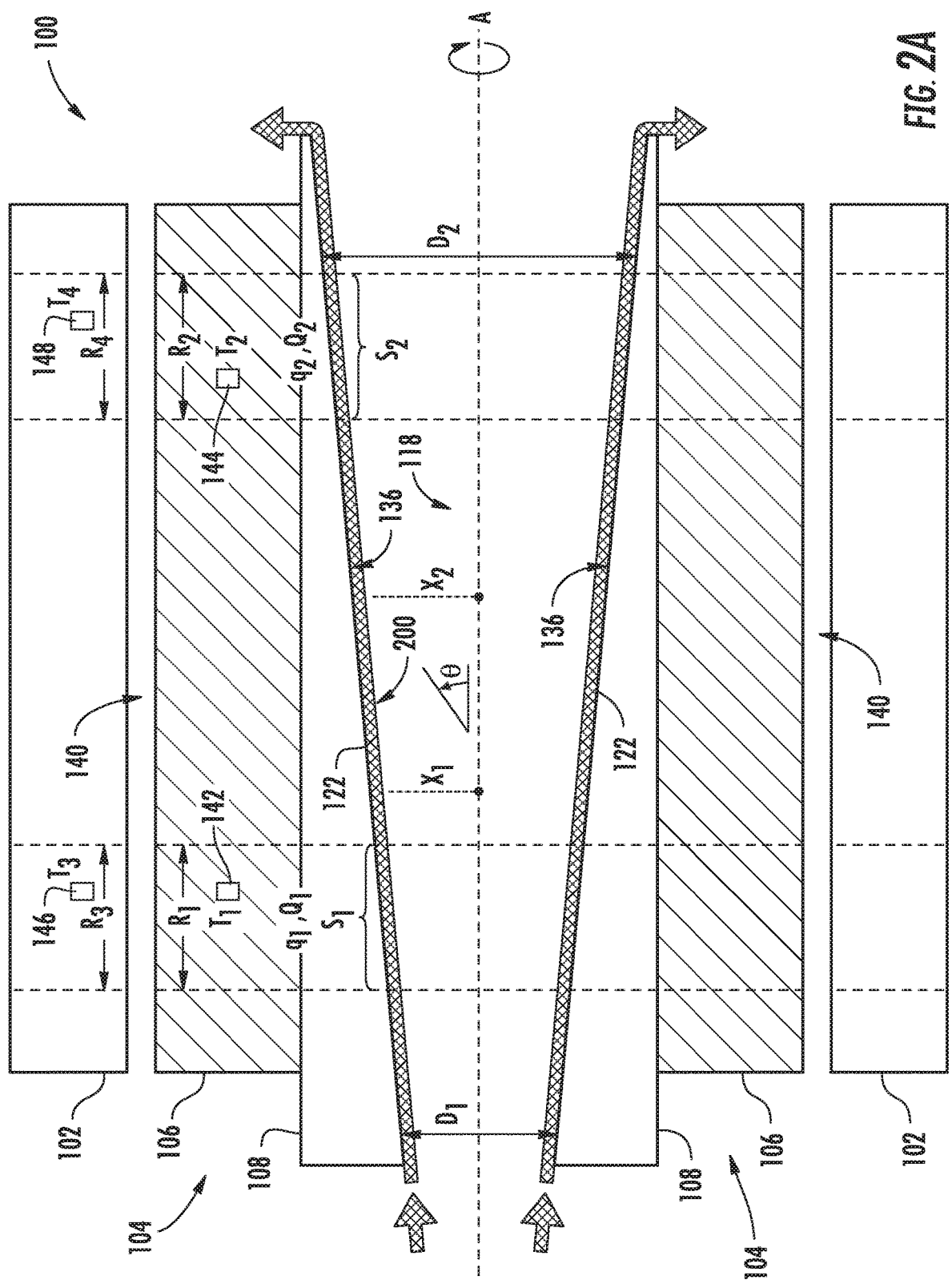

The rotor shaft 108 shown in FIG. 2A has a sloped inner surface 122 with a frustoconical or sloped profile 200 and a linear slope θ. The slope θ remains linear along the longitudinal length of the rotor shaft 108 from an upstream point $X_1$ to a downstream point $X_2$.

Figure 2B:
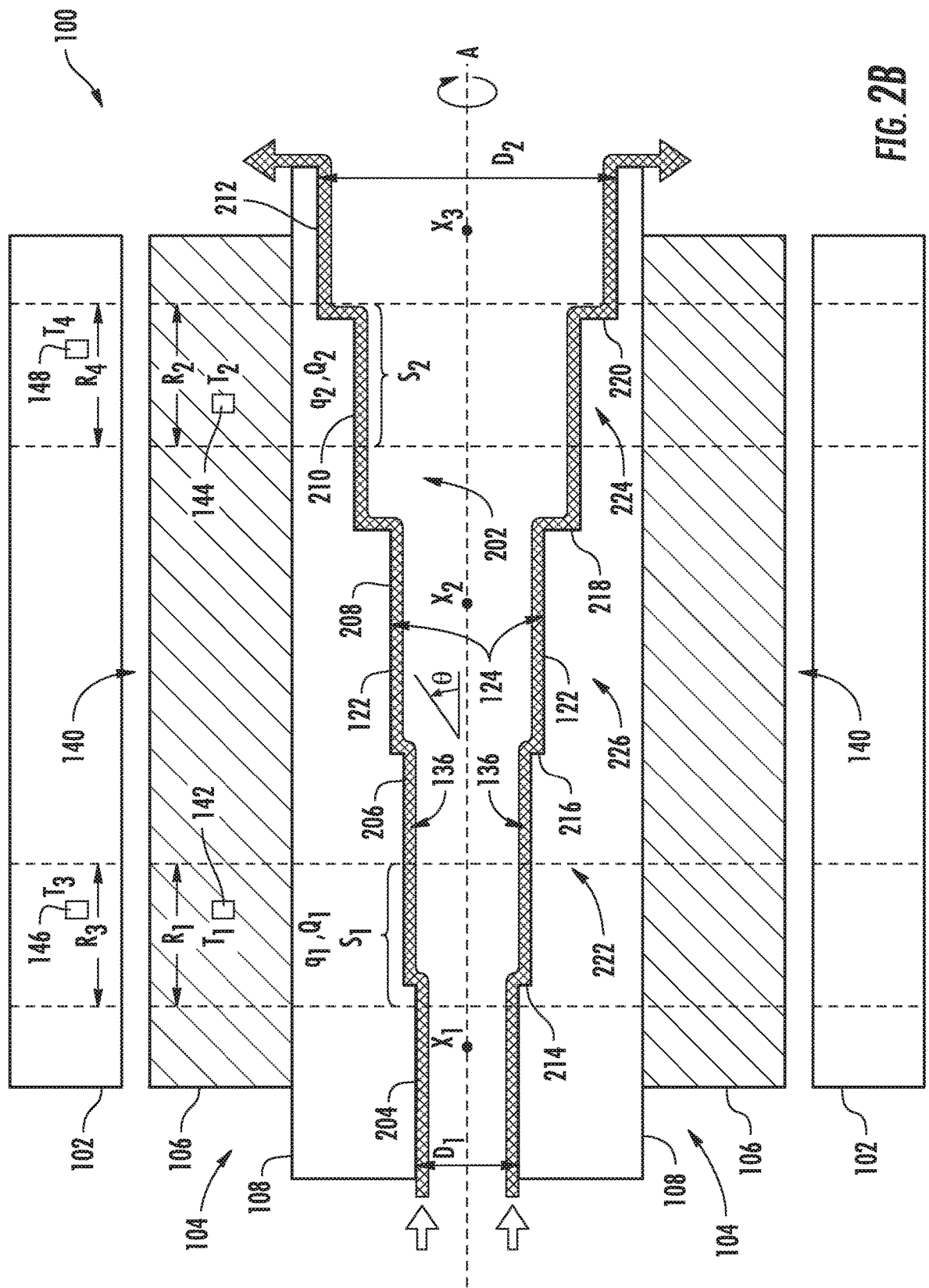

The rotor shaft shown in FIG. 2B has a sloped inner surface 122 with a stepped cylindrical profile 202. The stepped cylindrical profile includes a plurality of cylindrical regions adjoined by a step transitioning from one cylindrical region to the next. The step may be perpendicular or transverse (i.e., nonorthogonal) to the longitudinal axis. As shown in FIG. 2B, the stepped cylindrical profile includes five cylindrical regions (i.e., a first cylindrical region 204, a second cylindrical region 206, third cylindrical region 208, fourth cylindrical region 210, fifth cylindrical region 212) and four steps (i.e., a first step 214, a second step 216, a third step 218, a fourth step 220); however, any number of cylindrical regions and/or steps may be provided. A rotor shaft with a stepped cylindrical profile 202 may have a linear slope θ and/or a non-linear slope θ. As shown in FIG. 2B, a first stepped cylindrical profile 222 has first linear slope θ along a longitudinal length of the rotor shaft 108 from an upstream point $X_1$ to a downstream point $X_2$. A second stepped cylindrical profile 224 has a second linear slope θ along a longitudinal length of the rotor shaft 108 from an upstream point $X_2$ to a downstream point $X_3$. The first stepped cylindrical profile 222 and the second stepped cylindrical profile 224 together form a third stepped cylindrical profile 226, which has a non-linear slope θ along a longitudinal length of the rotor shaft 108 from an upstream point $X_1$ to a downstream point $X_3$.

Figure 2D:
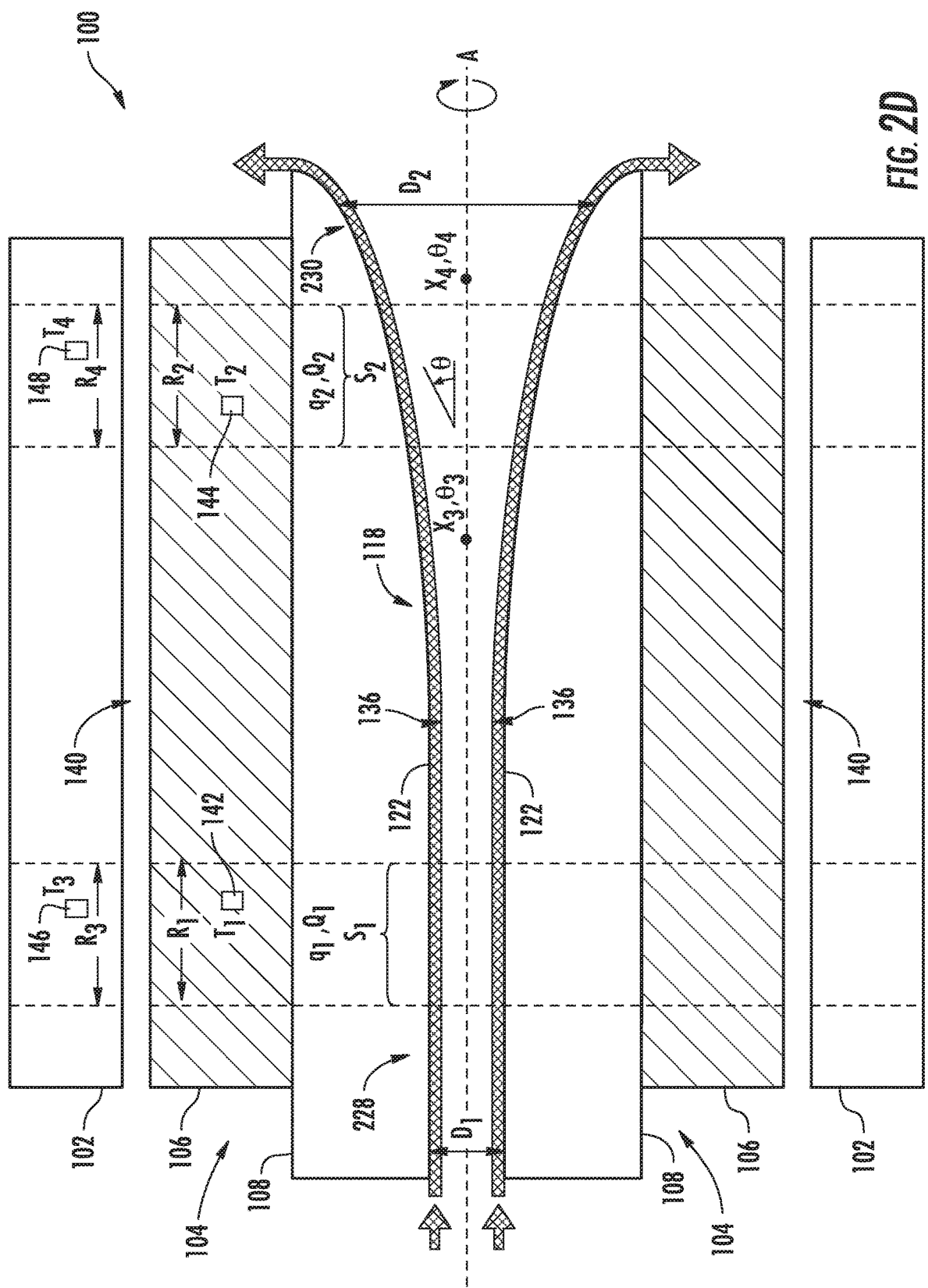

The rotor shafts 108 shown in FIGS. 2C and 2D each have a sloped inner surface 122 with a frustoconical or sloped profile and a non-linear slope θ. As shown in FIG. 2C, a sloped inner surface 122 may include a first slope $θ_1$ at an upstream point $X_1$ and a second slope $θ_2$ at a downstream point $X_2$ on the longitudinal length of the rotor shaft. The first slope $θ_1$ may exceed the second slope $θ_2$, such that the non-linear slope θ decreases across a longitudinal length of the rotor shaft. As shown in FIG. 2D, the sloped inner surface 122 may include a third slope $θ_3$ at an upstream point $X_3$ and a fourth slope $θ_4$ at a downstream point $X_4$ on the longitudinal length of the rotor shaft. The fourth slope $θ_4$ may exceed the third slope $θ_3$ exceeds, such that the non-linear slope θ increases across a longitudinal length of the rotor shaft.

Figure 2E:
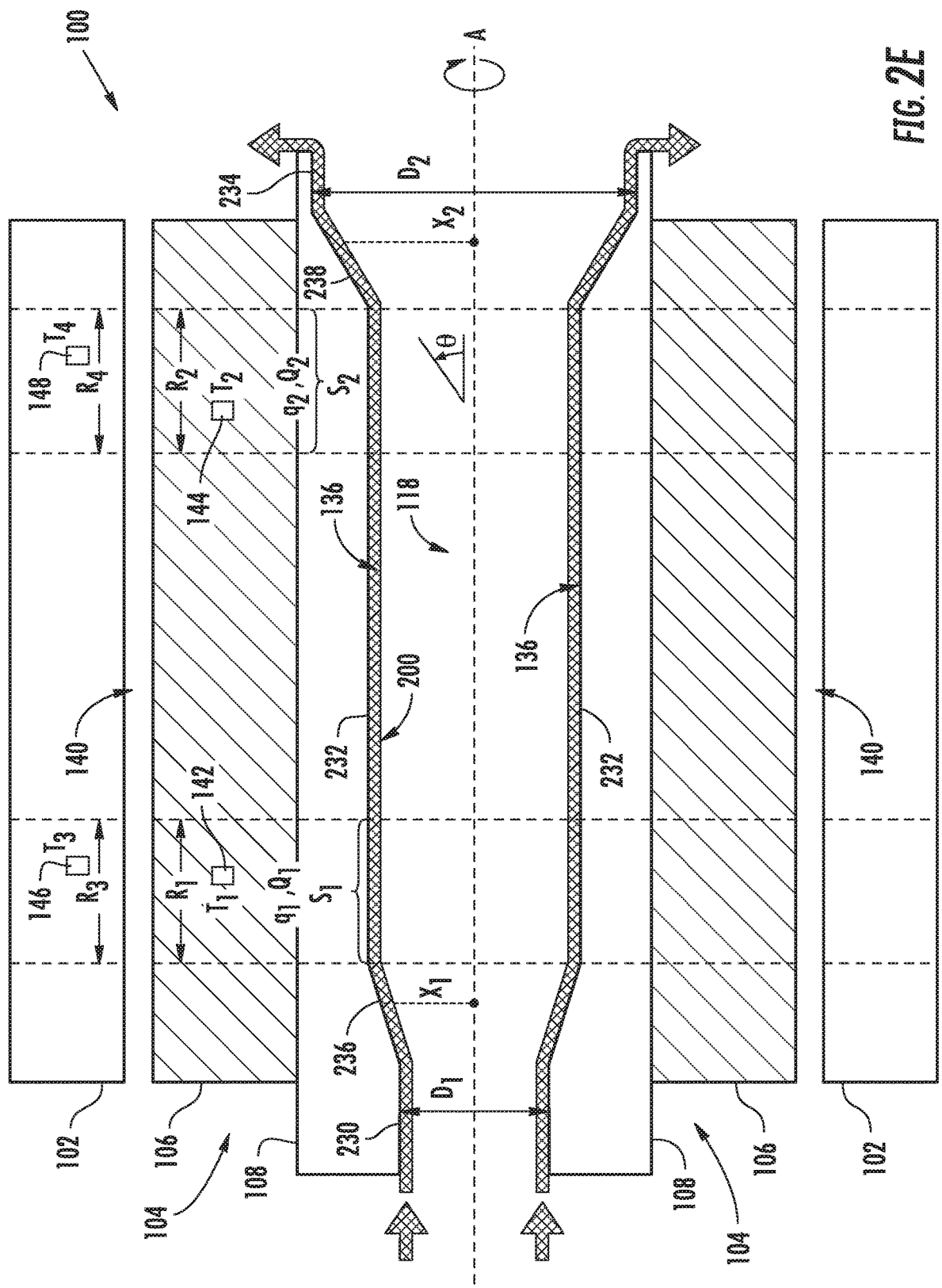

In some embodiments, the hollow region 118 of the rotor shaft 108 may include a combination of cylindrical regions and sloped regions. A cylindrical region may transition to a sloped region, and/or a sloped region may transition to a cylindrical region. The transition may be a step transition and/or a gradual transition. For example, as shown in FIG. 2D, the hollow region 118 of the rotor shaft 108 may include a cylindrical region 228 which gradually transitions to a sloped region 230. Alternatively, or in addition, a rotor shaft 108 may include a sloped region that gradually transitions to a cylindrical region. As shown in FIG. 2E, the hollow region 118 of the rotor shaft 108 may include a plurality of cylindrical regions adjoined by a sloped region. Any number of cylindrical regions and/or sloped regions may be provided. For example, FIG. 2E shows three cylindrical regions (i.e., a first cylindrical region 230, a second cylindrical region 232, and a third cylindrical region 234), and two sloped regions (i.e., a first sloped region 236, and a second sloped region 238). The sloped regions may have a linear and/or non-liner slope, and the slope θ of one sloped region may differ from the slope θ of another sloped region. For example, the first sloped region 236 has a first slope $\theta_1$ at a first point $X_1$ on the longitudinal axis and the second sloped region 238 has a second slope $\theta_2$ at a point $X_2$ on the longitudinal axis.

Now referring to FIGS. 3A-3H, the inner surface 120 of the rotor shaft 108 or a portion thereof may include surface features, such as ridges, grooves, bumps, dimples, and the like, or combinations thereof. While such surface features are described generally with reference to the inner surface 120 of the rotor shaft 108, such surface features may be additionally or alternatively included on all or at least a portion of a rotor cooling conduit 800, as discussed below with respect to FIGS. 8A-8D. In some embodiments, surface features may be configured to augment the flow of coolant 130 across the inner surface of the rotor shaft 108. Additionally, or in the alternative, surface features may augment the rate of heat transfer from the inner surface 120 of the rotor shaft 108 to the coolant 130. For example, various types of surface features may prevent or induce pooling, prevent or induce turbulence, provide a uniform or varied film 136 thickness, and/or advance or inhibit the flow of coolant 130 along the inner surface 120 of the rotor shaft 108.

Figure 3A:
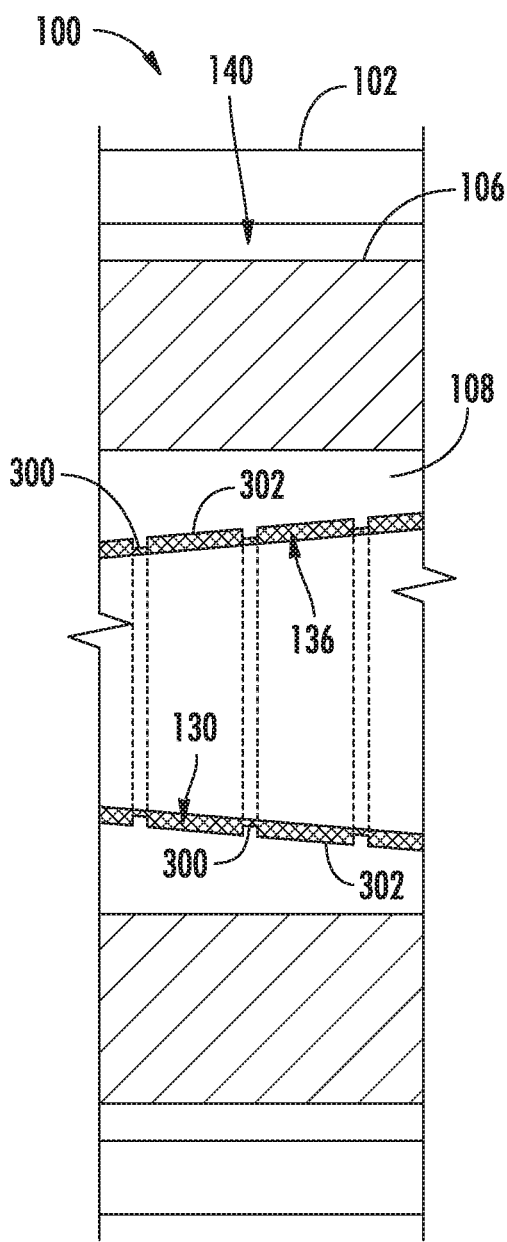
FIGS. 3A and 3B schematically show a partial cross-sectional perspective view of exemplary embodiments of a liquid cooled rotor shaft with exemplary surface features.
Figure 3B:
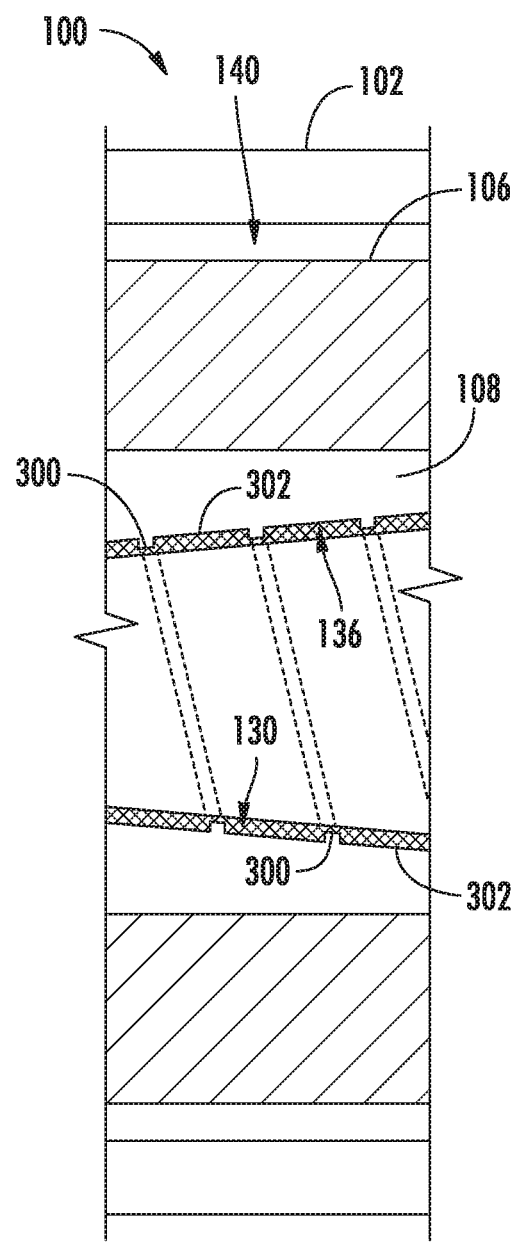

As shown in FIGS. 3A and 3B, the inner surface of the rotor shaft 108 may include one or more ridges 300 and/or grooves 302. The ridges 300 may have any desired height and/or any desired width, and the grooves 302 may have any desired depth and/or any desired width. The ridges 300 and/or grooves 302 may have any desired angular orientation relative to the longitudinal axis A of the rotor shaft 108. The angular orientation of the grooves 300 and/or ridges 302 may be perpendicular, parallel, transverse (i.e., nonorthogonal), or a combination thereof, relative to the longitudinal axis A. As shown in FIG. 3A, the ridges 300 and/or grooves 302 may be oriented perpendicular to the longitudinal axis A, forming a plurality of annular ridges 300 and/or annular grooves 302. Additionally, or in the alternative, as shown in FIG. 3B, the ridges 300 and/or grooves 302 may have a spiral orientation relative to the longitudinal axis A. The spiral orientation may have a forward pitch or a reverse pitch relative to the direction of rotation of the rotor shaft 108. A forward pitch typically advances coolant 130 along the inner surface 120 of the rotor shaft 108, whereas a reverse pitch typically impedes advancement of coolant 130 along the inner surface 120 of the rotor shaft 108.

Figure 3C:
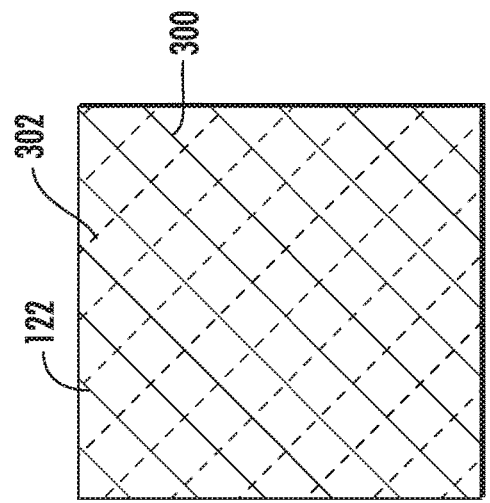
FIGS. 3C-3H schematically show additional exemplary surface features which may be provided on an inner surface of a liquid cooled rotor shaft.
Figure 3D:
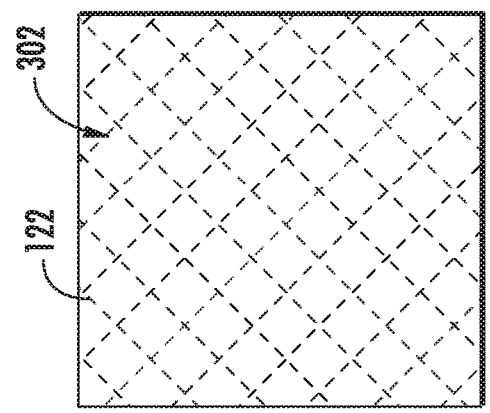
Figure 3E:
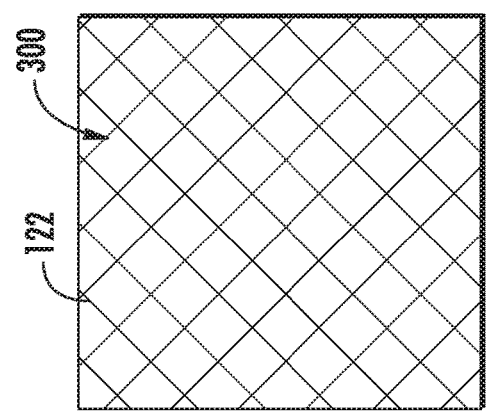

As shown in FIGS. 3C-3E, the inner surface 120 of a rotor shaft 108 may include an array of intersecting ridges 300 (FIG. 3C), an array of intersecting grooves 302 (FIG. 3D), and/or an array of intersecting ridges 300 and grooves 302 (FIG. 3E).

Figure 3F:
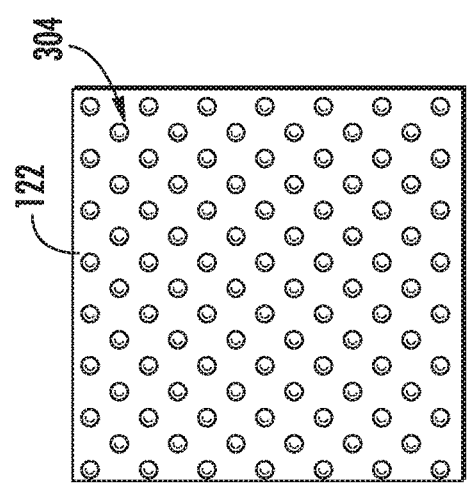
Figure 3G:
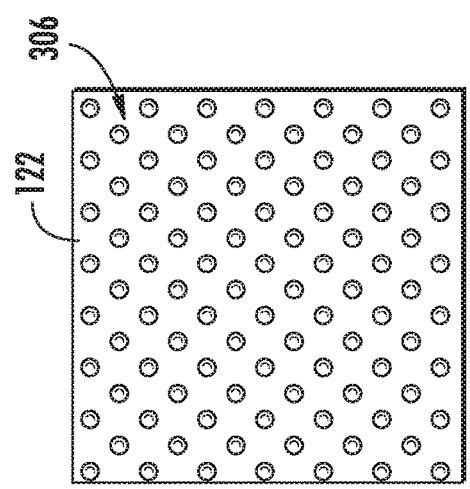
Figure 3H:
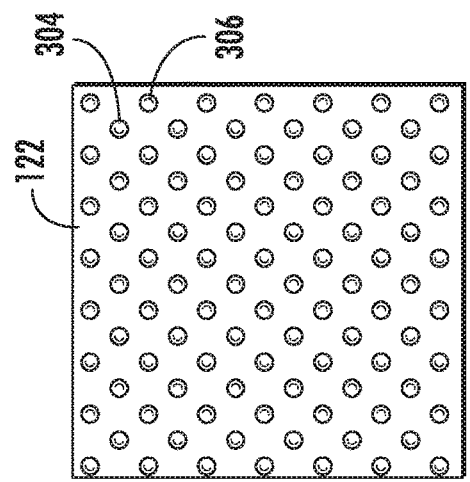
Figure 4D:
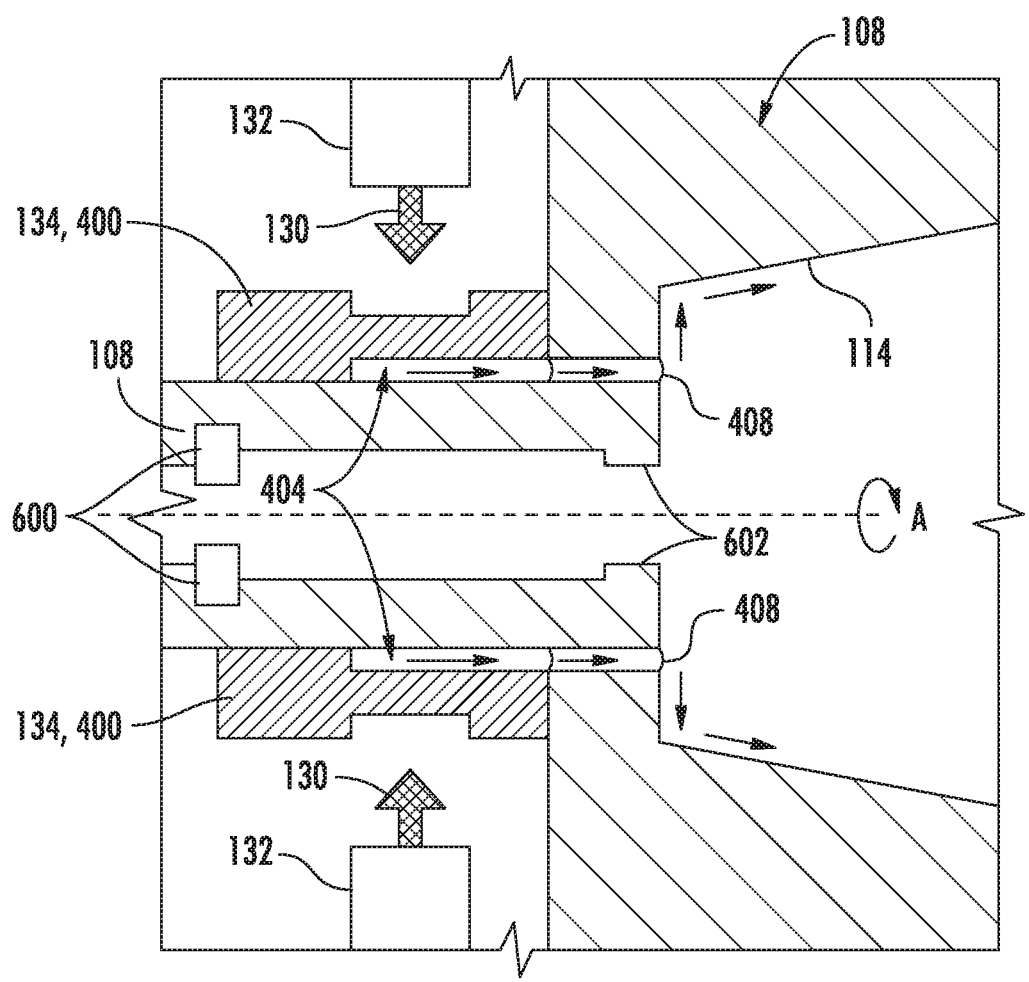
FIG. 4D schematically shows a cross-sectional perspective view of the impeller of FIGS. 4A-4C, installed on a rotor shaft.

As shown in FIGS. 3F-3H, the inner surface 120 of a rotor shaft 108 may include an array of dimples 304 (FIG. 3C), an array of bumps 306 (FIG. 3D), and/or an array of dimples and bumps 308 (FIG. 3E).

In some embodiments, surface features, such as grooves, ridges, bumps, dimples, and the like, or combinations thereof, on the inner surface 120 of the rotor shaft 108 may induce turbulence in the coolant 130 flowing across the inner surface 122 of the rotor shaft 108. Additionally, or in the alternative, such surface features may augment the direction in which coolant 130 flows across the inner surface of rotor shaft 108. Such turbulence or augmented direction of flow may enhance heat transfer between the inner surface 122 of the rotor shaft 108 and the coolant 130. Additionally, such surface features add surface area to the inner surface 122 of the rotor shaft 108, which also may augment heat transfer between the inner surface 122 of the rotor shaft 108 and the coolant 130.

In some embodiments, surface features may be selectively provided, omitted, shaped, and/or configured at a first annular surface area $S_1$ and/or a second annular surface area $S_2$ so as to augment temperature and/or heat transfer. For example, surface features may be selectively provided, omitted, shaped, and/or configured so as to provide a substantially uniform temperature and/or width of the air gap 140 across a longitudinal length of the rotor shaft 108 and/or rotor core 106 (e.g., as between the first region $R_1$ and the second region $R_2$). For example, surface features may be selectively provided, omitted, shaped, and/or configured so as to at least partially offset an expected change in the rate of heat transfer per unit area q due to an increasing temperature of the coolant 130 across the longitudinal length of the rotor shaft 108 with a proportional change in the annular surface area of the inner surface of the rotor shaft 108. Under certain operating conditions, the offset obtained by the selected surface features may provide for a substantially uniform quantity of heat energy Q from the inner surface 122 of the rotor shaft 108 to the coolant 130 across a given length of the longitudinal axis of the rotor shaft 108 as between the first annular surface area $S_1$ and the second annular surface area $S_2$.

Surface features may provide an increasingly larger annular surface area for a given region of the rotor shaft 108. An increase in the temperature of the coolant 130 and corresponding change to the rate of heat transfer per unit area q across the longitudinal length of the rotor shaft 108 may be at least partly offset, and/or the width of the air gap 140 may be at least partially equalized, by selectively providing, omitting, shaping, and/or configuring surface features, as between respective regions $R_1$ and $R_2$ of the inner surface 120 of the rotor shaft 108. Similarly, a difference between the quantity of heat energy Q generated in or transferring to the respective regions $R_1$ and $R_2$ may be at least partially offset by selectively providing, omitting, shaping, and/or configuring surface features as between respective regions $R_1$ and $R_2$ of the inner surface 120 of the rotor shaft 108.

In some embodiments, surface features may be selectively provided, omitted, shaped, and/or configured so as to maintain a substantially uniform temperature as between the temperature $T_1$ of the first region $R_1$ and the temperature $T_2$ of the second region $R_2$. For example, surface features may be selectively provided, omitted, shaped, and/or configured so as to selectively increase the annular surface area from a first annular surface area $S_1$ corresponding to a first region R₁ to a second annular surface area S₂ corresponding to a second region R₂. Further in addition or in the alternative, surface features may be selectively provided, omitted, shaped, and/or configured so as to maintain a substantially uniform width of the air gap 140 as between the first region R₁ and the second region R₂. The provision, omission, shape, and or configuration of surface features may be uniform or variable. The surface features may be selectively provided, omitted, shaped, and/or configured at least in part to offset an increasing coolant 130 temperature across a longitudinal length of the rotor shaft and/or to at least partially offset a difference between the quantity of heat energy Q generated in or transferring to respective regions of the rotor shaft 108.

Now referring to FIGS. 4A-4D, and FIGS. 5A-5D, in some embodiments an electric machine 100 may include an impeller 134 operably coupled to the rotor shaft 108. The impeller 134 includes an annular body 400 configured to be operably coupled to the rotor shaft 108, for example, by one or more of a pressed fit, a channel and groove, a retaining pin, a set screw, or the like, thereby allowing the impeller 134 to rotate in conjunction with the rotor shaft 108. The annular body has one or more impeller blades 402 and a corresponding one or more impeller channels 404, which scoop and/or push coolant 130 axially with respect to the rotor shaft 108. The coolant 130 may be supplied to the impeller 134, for example, by one or more nozzles 132, which may be configured to inject the coolant 130 radially towards the impeller 134. The one or more nozzles 132 may be located radially adjacent to the impeller, and may inject a stream of coolant 130 towards the impeller at any desired angle or orientation.

Figure 5C:
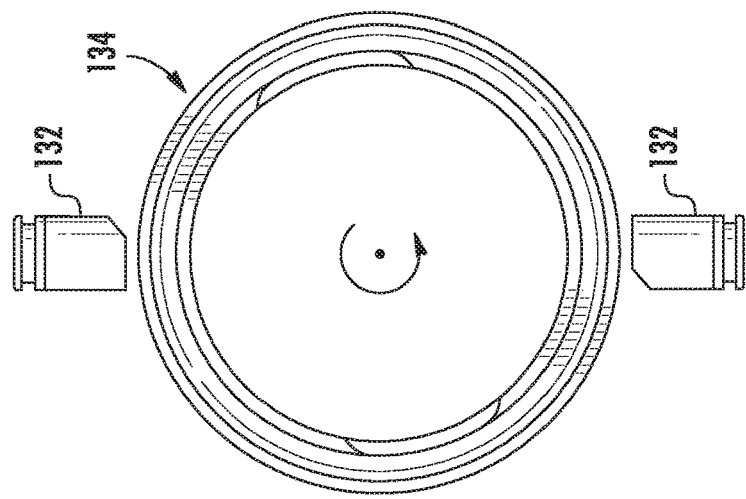
FIGS. 5A-5C schematically show a perspective view, an upstream end-view, and a downstream end-view, respectively, of an exemplary bidirectional impeller that may be operably coupled to a rotor shaft for supplying a coolant to the rotor shaft.
Figure 5B:
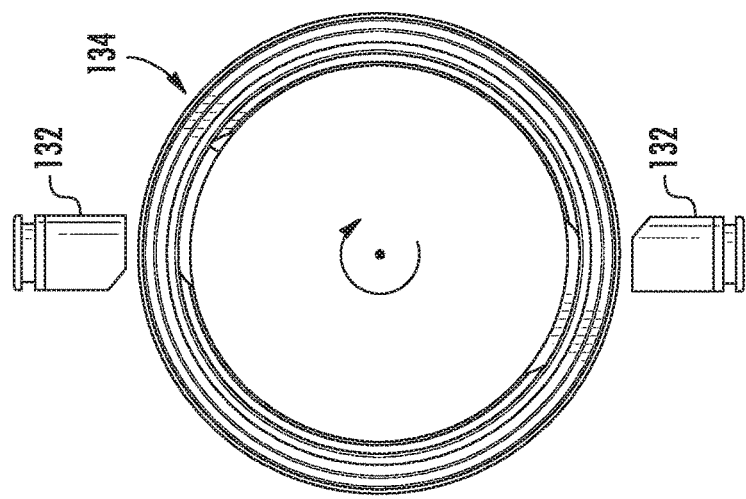
Figure 5A:
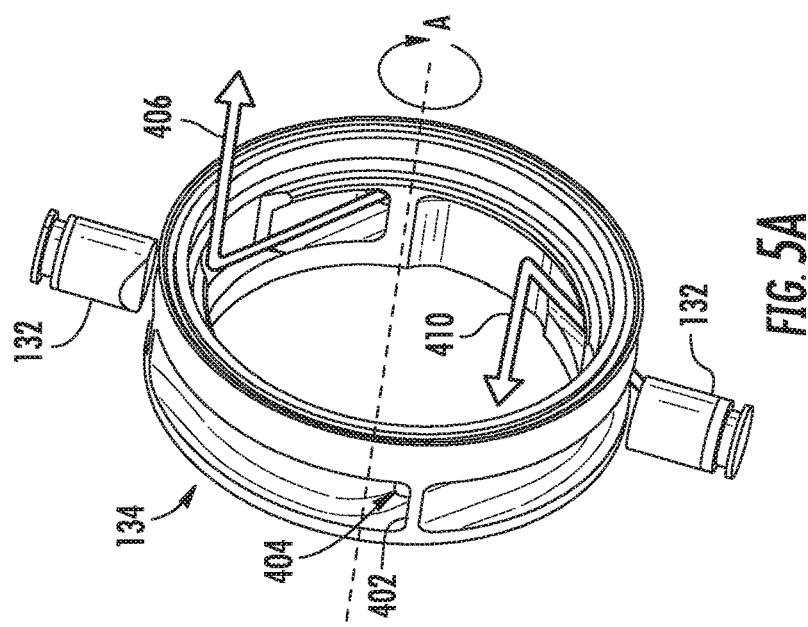
Figure 5D:
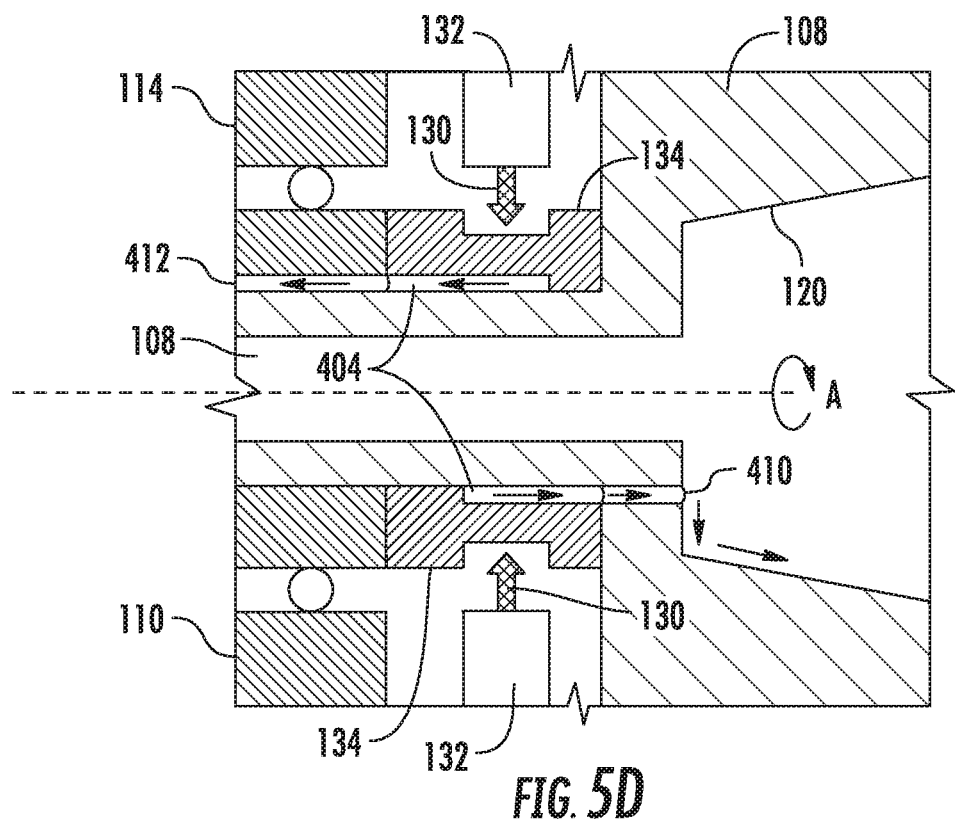
FIG. 5D schematically shows a cross-sectional perspective view of the bidirectional impeller of FIGS. 5A-5C.
Figure 9:
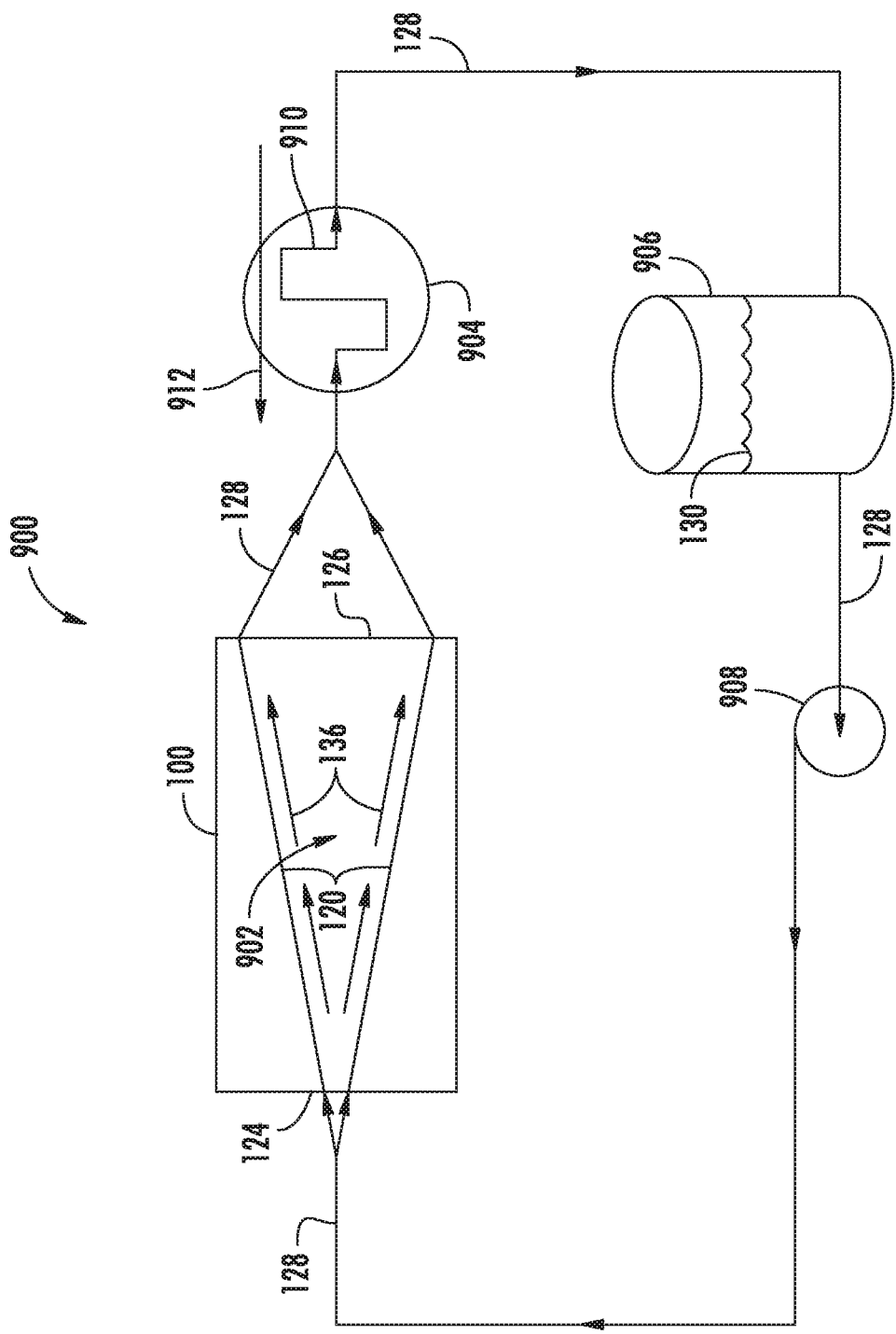
FIG. 9 schematically shows an exemplary cooling system for an electric machine that includes a liquid cooled rotor shaft.

As shown, a plurality of impeller blades 402 and corresponding impeller channels 404 are provided. The impeller channels 404 transition from a radial orientation to an axial orientation, redirecting the coolant 130 axially as indicated by arrows 406. The plurality of impeller channels 404 may be unidirectional (FIGS. 4A-4D) or bidirectional (FIGS. 5A-5D). A unidirectional plurality of impeller channels 404 direct a stream of coolant 130 in one direction axially along a rotor shaft 108, for example, allowing the coolant 130 to flow through a plurality of coolant supply holes 408 and into the hollow region 118 of the rotor shaft 108. A bidirectional plurality of impeller channels 404 direct a stream of coolant in both directions axially along a rotor shaft 108. In the case of a bidirectional plurality of impeller channels 404 (FIGS. 5A-5D), a first portion of coolant 130 flows in a first axial direction as indicated by arrow 406, and a second portion of coolant 130 flows in a second axial direction as indicated by arrow 410 (FIG. 5A). The first axial flow of coolant 130 indicated by arrow 406 passes through a plurality of coolant supply holes 408 and into the hollow region 118 of the rotor shaft 108. The second axial flow of coolant 130 indicated by arrow 410 passes through a bearing cooling or lubrication channel 412 or the like, configured to cool or lubricate one or more bearing assemblies 114. Coolant 130 passing through the bearing cooling or lubrication channel 412 may be returned to the cooling conduit 128 and/or to a coolant reservoir (FIG. 9).

Figure 6:
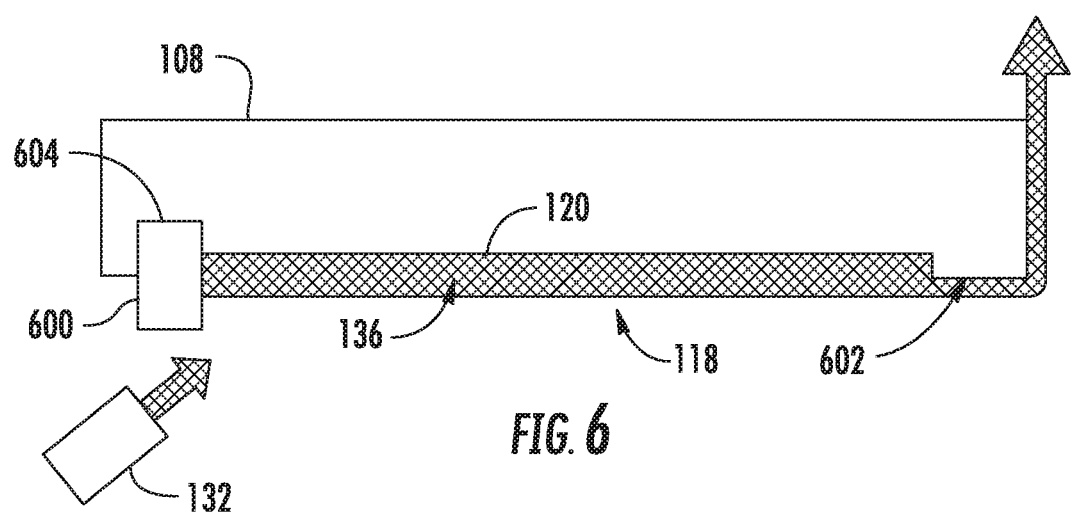
FIG. 6 schematically shows a cross-sectional perspective view of exemplary annular coolant dams that may be provided in a liquid cooled rotor shaft.

Now referring to FIG. 6, in some embodiments, the inner surface 120 of the rotor shaft 108 may include one or more annular coolant dams traversing the perimeter of the inner surface 120. An annular coolant dam may be located at the first end 124 of the rotor shaft 108, at the second end 126 of the rotor shaft 108, and/or at an intermediate point between the first end 124 and the second end 126 of the rotor shaft 108. FIG. 6 shows a first annular coolant dam 600, which may be located at the first end of the rotor shaft 108 and a second annular coolant dam 602, which may be located at the second end of the rotor shaft 108. An annular coolant dam may include a rubber, elastomeric, or thermoplastic material formed into the shape of an annulus sized to be fitted into an annular groove 604 formed on the inner surface of the rotor shaft 108. Alternatively or in addition, an annular coolant dam may be formed as an integral part of the rotor shaft 108. As shown, an annular groove 604 receives and/or retains the first annular coolant dam 600, and the second annular coolant dam 602 is formed as an integral part of the rotor shaft 108. The first annular coolant dam may be located at an interface between the rotor shaft 108 and a drive shaft (not shown).

An annular coolant dam (e.g., the first annular coolant dam 600) may be configured to scoop or push coolant 130 axially along the inner surface 120 of the rotor shaft 108. For example, as shown, one or more nozzles 132 may inject a stream of coolant 130 such that the stream of coolant passes across the first annular coolant dam 600 and into the hollow region 118 of the rotor shaft 108. An annular coolant dam (e.g., the first annular coolant dam 600) may be utilized in addition or as an alternative to an impeller 134 for providing an axial flow of coolant 130 to the inner surface 120 of the rotor shaft 108. A annular coolant dam (e.g., the first annular coolant dam 600) may accumulate a head of coolant 130, causing the coolant 130 to flow across the inner surface 120 of the rotor shaft 108. Accordingly, a force acting upon the coolant 130 and causing the coolant 130 to flow across the inner surface 120 of the rotor shaft 108 may include a longitudinal force induced by an annular coolant dam (e.g., the first annular coolant dam 600).

An annular coolant dam (e.g., the second annular coolant dam 602) may provide a longitudinal force inverse to the longitudinal direction of coolant flow, increasing the thickness of the coolant 130 (e.g., the film 136) flowing across the inner surface 120 of the rotor shaft 108. For example, such thickness may depend at least in part on the height of the second annular coolant dam 602. As coolant 130 accumulates along the inner surface 120 of the rotor shaft 108, the thickness of the coolant 130 increases and exceeds the height of the annular coolant dam (e.g., the second annular coolant dam 602), thereby allowing the coolant 130 to flow past the annular coolant dam (e.g., the second annular coolant dam 602).

Figure 7A:
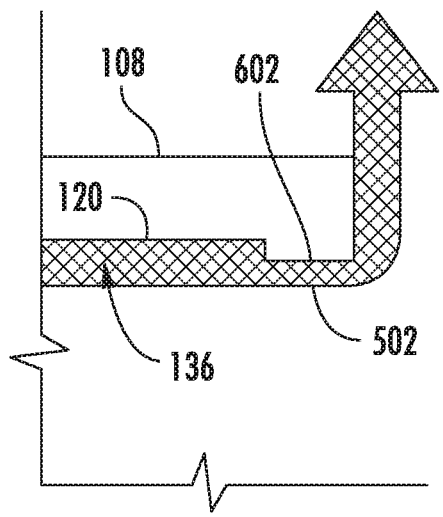
FIGS. 7A-7C schematically show partial cross-sectional perspective views of exemplary pathways for discharging coolant from a rotor shaft.
Figure 7B:
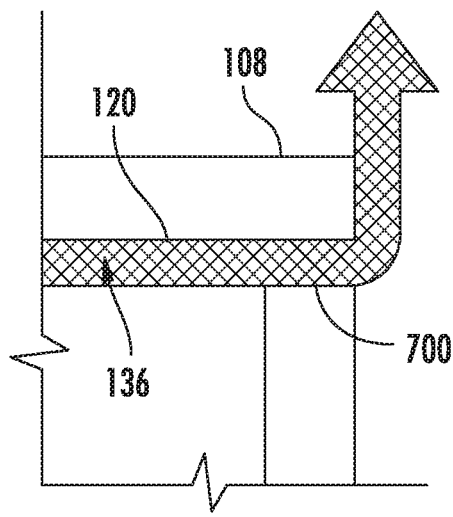
Figure 7C:
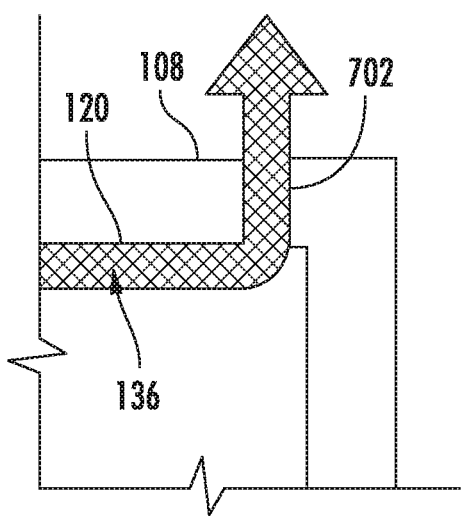

As shown in FIGS. 7A-7C, coolant 130 may be discharged from the hollow region 118 of the rotor shaft 108 through an open end of the rotor shaft 108 (FIG. 7A), and/or through one or more axial coolant discharge holes 700 (FIG. 7B), and/or through one or more radial coolant discharge holes 702 (FIG. 7C). It will be appreciated that the coolant discharge holes 700, 702 may also be angled, and need not be limited to axial or radial orientations. Additionally, it will be appreciated that a rotor shaft 108 may be provided with an annular coolant dam 602, one or more axial coolant discharge holes 700, and/or one or more radial coolant discharge holes 702, alone or in combination with one another. Coolant 130 flowing across the inner surface 120 of the rotor shaft 108 may flow longitudinally past the annular coolant dam 602 and/or through the one or more axial coolant discharge holes 700 or radial discharge holes 702, and out of the hollow region 118 of the rotor shaft 108. Coolant flowing out of the hollow region 118 of the rotor shaft 108 may flow into a sump area 138 (FIG. 1) and/or into a cooling conduit 128 as described below with respect to FIG. 9.

Now referring to FIGS. 8A-8D, in some embodiments, an electric machine 100 may include a rotor cooling conduit 800 integrally formed within the body of the rotor shaft 108. The rotor cooling conduit 800 defines a pathway for circulating the coolant 130 through the body of the rotor shaft 108. During operation, coolant 130 circulates through the rotor cooling conduit 800, and heat energy Q transfers from the rotor shaft 108 and/or the rotor core 106 to the coolant 130 flowing through the rotor cooling conduit 800 by thermal conduction. The coolant 130 exits the rotor cooling conduit 800 having been heated by the thermally conductive relationship with the rotor shaft 108. Coolant flowing out of the rotor cooling conduit 800 may flow into a sump area 138 (FIG. 1) and/or into a cooling conduit 128 as described below with respect to FIG. 9.

Figure 8A:
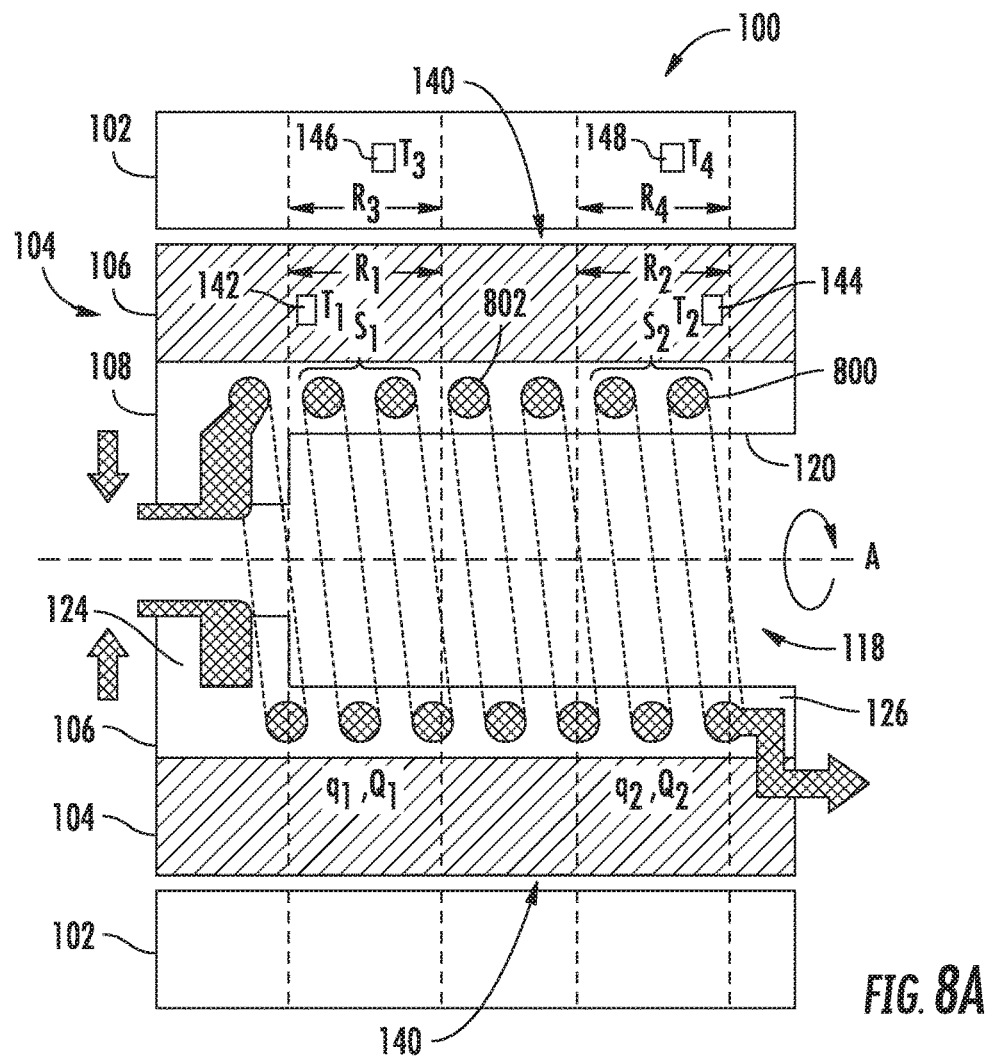
FIG. 8A schematically shows a cross-sectional perspective view of an exemplary rotor cooling conduit integrally formed within the body of a rotor shaft.
Figure 8B:
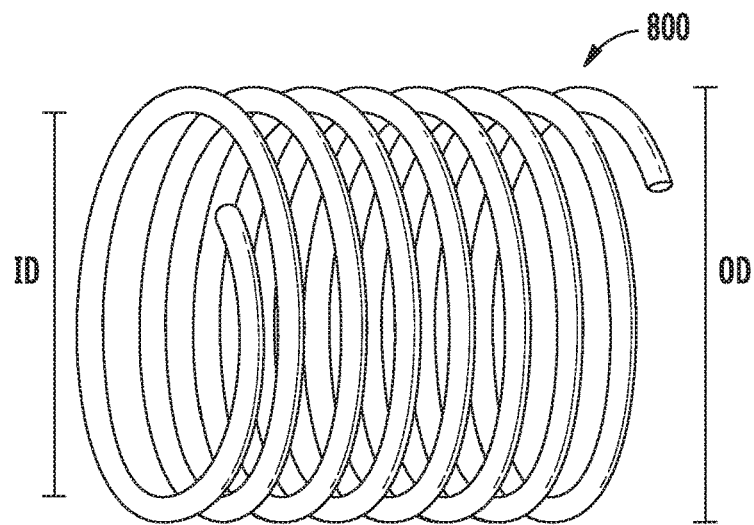
FIG. 8B schematically shows a perspective view of the rotor cooling conduit of FIG. 8A.
Figure 8C:
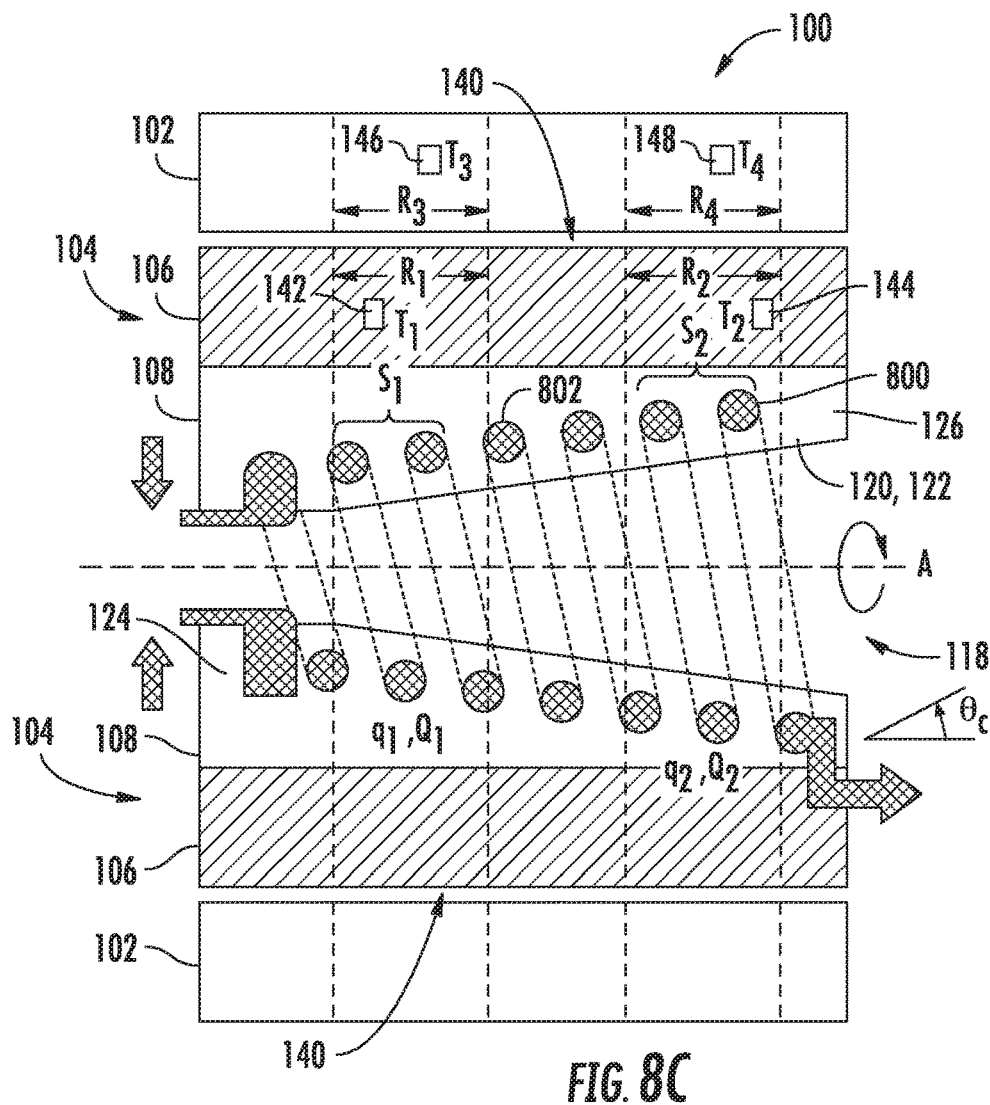
FIG. 8C schematically shows a cross-sectional perspective view of another exemplary rotor cooling conduit integrally formed within the body of a rotor shaft.

As shown, the rotor shaft 108 may have a hollow region 118 defined by an inner surface 120. However, a rotor cooling conduit 800 also may be integrally formed within the body of a rotor shaft 108 that does not include such a hollow region 118. Accordingly, a rotor shaft 108 may be cooled with coolant 130 flowing across the inner surface 120 of the rotor shaft 108, with coolant 130 flowing through a rotor cooling conduit 800 integrally formed within the body of the rotor shaft 108, or with coolant flowing both across the inner surface 120 of the rotor shaft 108 and through the rotor cooling conduit 800. When the rotor shaft 108 includes a hollow region 118, the inner surface 120 of the rotor shaft 108 may have a cylindrical profile as shown in FIG. 8A, a frustoconical or sloped profile as shown in FIG. 8C, or a combination of cylindrical regions and frustoconical or sloped regions. A rotor cooling conduit 800 may be provided as an alternative or in addition to a hollow region 118 defined by an inner surface 120 of the rotor shaft 108. Accordingly, a flow of coolant 130 may be supplied to a rotor cooling conduit 800, to a hollow region 118 of the rotor shaft 108, or both. Additionally, any of the various surface features described herein or combinations thereof may be provided within a rotor cooling conduit 800.

Figure 8D:
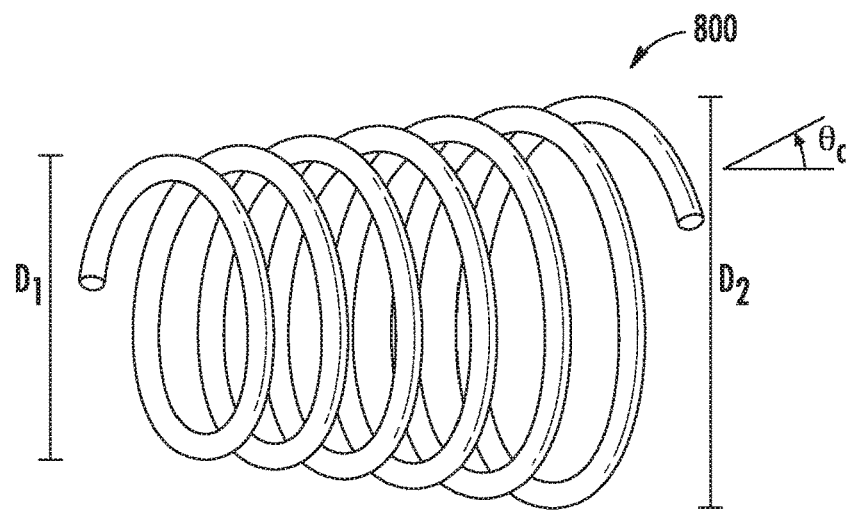
FIG. 8D schematically shows a perspective view of the rotor cooling conduit of FIG. 8C.

A rotor cooling conduit 800 may have any desired angular orientation relative to the longitudinal axis A of the rotor shaft 108. The rotor cooling conduit 800 may include one or more channels, tubes, pathways, inter-connected or interlaced unit cells, or the like that traverse the rotor shaft 108 in a perpendicular, parallel, and/or a transverse (i.e., nonorthogonal) orientation relative to the longitudinal axis. As shown, the rotor cooling conduit 800 may traverse the rotor shaft 108 with a spiral orientation relative to the longitudinal axis. As shown in FIGS. 8A and 8B, a rotor cooling conduit 800 may form a spiral with a relatively constant inner diameter and/or outer diameter. Alternatively, as shown in FIGS. 8C and 8D, a rotor cooling conduit 800 may form a spiral with a sloped inner diameter (ID) and/or outer diameter (OD). At least a portion of the rotor cooling conduit 800 may have a slope $\theta_c$ that extends across at least a portion of the longitudinal length of the rotor shaft 108 from a first diameter (e.g., ID and/or OD) $D_1$ at a first end 124 of the rotor shaft 108 to a second inner diameter (e.g., ID and/or OD) $D_2$ at a second end 126 of the rotor shaft 108.

With the rotor shaft 108 rotating at an operating rate of rotation, a force that includes a centrifugal force caused by rotation of the rotor shaft 108 acts upon the coolant 130. The centrifugal force overcomes the force of gravity as the rate of rotation increases, causing the coolant 130 to flow through the rotor cooling conduit 800, at least partially filling the rotor cooling conduit 800. The force acting upon the coolant 130 may additionally include other force components, including a slope component corresponding to the slope $\theta_c$ of the rotor cooling conduit 800. The force causes the coolant 130 to flow across the inner surface 120 of the rotor cooling conduit 800. The thickness of the film 136 and/or the velocity of the coolant 130 flowing across the inner surface 120 of the rotor shaft 108 may depend at least in part on the slope $\theta_c$ of the rotor cooling conduit 800 and/or the rotating speed of the rotor shaft 108.

The slope $\theta_c$ of the rotor cooling conduit 800 may range from 0° to 90° relative to a longitudinal axis A of the rotor shaft 108. A slope of 0° corresponds to a cylindrical profile of the rotor cooling conduit 800. A slope greater than 0° and less than 90° corresponds to a frustoconical or sloped profile of the rotor cooling conduit 800. A slope of 90° corresponds to a perpendicular stepped profile transitioning from one region to another of the rotor cooling conduit 800. A rotor cooling conduit 800 may have a slope $\theta_c$ that ranges from greater than 0° and less than 90°. For example, the slope $\theta_c$ may range from 0.1° to 60°, such as from 1° to 60°, such as from 1° to 5°, such as from 1° to 15°, such as from 5° to 10°, such as from 10° to 25°, such as from 25° to 45°, or such as from 45° to 60°. The slope $\theta_c$ may be at least 0.1°, such as at least 1°, such as at least 5°, such as at least 10°, such as at least 15°, such as at least 20°, such as at least 30°, such as at least 40°, such as at least 50°, or such as at least 60°. The slope $\theta_c$ may be less than 90°, such as less than 60°, such as less than 50°, such as less than 40°, such as less than 30°, such as less than 20°, such as less than 15°, such as less than 10°, such as less than 5°, or such as less than 1°.

In some embodiments, the slope $\theta_c$ of the rotor cooling conduit 800, the surface area thereof, and/or the presence or omission of surface features thereon, may be selected to provide a uniform temperature and/or a uniform width of the air gap 140 across a longitudinal length of the rotor shaft 108 and/or rotor core 106 (e.g., as between the first region $R_1$ and the second region $R_2$). For example, the slope $\theta_c$ of the rotor cooling conduit 800, the surface area S thereof, and/or the presence or omission of surface features thereon, may be selected so as to at least partially offset an expected change in the rate of heat transfer per unit area q due to an increasing temperature of the coolant 130 across the longitudinal length of the rotor shaft 108 with a proportional change in the annular surface area of the inner surface of the rotor shaft 108. Under certain operating conditions, the offset obtained by the selected slope $\theta_c$ of the rotor cooling conduit 800, the surface area S thereof, and/or the presence or omission of surface features thereon may provide for a substantially uniform quantity of heat energy Q from the inner surface 802 of the rotor cooling conduit 800 to the coolant 130 across a given length of the longitudinal axis of the rotor shaft 108 as between the first annular surface area $S_1$ and the second annular surface area $S_2$ of the rotor cooling conduit 800.

The slope $\theta_c$ of the rotor cooling conduit 800 may provide an increasingly larger annular surface area for a given region of the rotor shaft. An increase in the temperature of the coolant 130 and corresponding change to the rate of heat transfer per unit area q across the longitudinal length of the rotor shaft 108 may be at least partly offset, and/or the width of the air gap 140 may be at least partially equalized, by selectively providing a rotor cooling conduit 800 having a selected slope $\theta_c$, a selected surface area S, and or a selected inclusion or omission of surface features, as between respective regions $R_1$ and $R_2$ of the rotor cooling conduit 800. Similarly, a difference between the quantity of heat energy Q generated in or transferring to the respective regions $R_1$ and $R_2$ may be at least partially offset by selectively providing a rotor cooling conduit 800 having a selected slope $\theta_c$, a selected surface area S, and or a selected inclusion or omission of surface features.

In some embodiments, the slope $\theta_c$, the surface area S, and/or the inclusion or omission of surface features, as between respective regions $R_1$ and $R_2$ of the rotor cooling conduit 800, may be selected so as to maintain a substantially uniform temperature as between the temperature $T_1$ of the first region $R_1$ and the temperature $T_2$ of the second region $R_2$. For example, the slope $\theta_c$, the surface area S, and/or the inclusion or omission of surface features may be selected so as to selectively increase the annular surface area from a first annular surface area $S_1$ corresponding to a first region $R_1$ to a second annular surface area $S_2$ corresponding to a second region $R_2$. Further in addition or in the alternative, the slope $\theta_c$, the surface area S, and/or the inclusion or omission of surface features may be selected so as to maintain a substantially uniform width of the air gap 140 as between the first region $R_1$ and the second region $R_2$. The selected slope $\theta_c$ may be uniform or variable. The slope $\theta_c$, surface area S, and/or the inclusion or omission of surface features, may be selected at least in part to offset an increasing coolant 130 temperature across a longitudinal length of the rotor shaft and/or to at least partially offset a difference between the amounts of heat energy Q generated in and/or transferring to respective regions of the rotor shaft 108.

The present disclosure additionally embraces systems for cooling an electric machine 100. FIG. 9 shows an exemplary system 900 for cooling an electric machine 100. The exemplary system 900 includes a coolant pathway 902 through the electric machine 100, a heat exchanger 904, a coolant reservoir 906, and a coolant pump 908. The coolant pathway 902 through the electric machine 100 is defined at least in part by the inner surface 120 of the rotor shaft 108 and/or a rotor cooling conduit 800. The exemplary system 900 further includes a cooling conduit 128, which defines a pathway for circulating a coolant 130 through the system 900. In some embodiments, at least a portion of the cooling conduit 128 may define a pathway through or around at least a portion of the housing assembly 110 of the electric machine 100. Additionally, or in the alternative, at least a portion of the cooling conduit 128 may define a pathway that runs external from the housing assembly 110.

As shown in FIG. 9, the cooling conduit 128 defines a pathway to the first end 124 of the rotor shaft 108. The cooling conduit 128 may have any desired configuration, including a cooling jacket surrounding at least a portion of the electric motor, and/or one or more internal channels, tubes, pathways, inter-connected or interlaced unit cells, or the like within the housing assembly 110 or otherwise surrounding at least a portion of the electric machine 100. During operation, coolant is pumped from the coolant reservoir 906 by the coolant pump 908 into the cooling conduit 128, which directs coolant 130 to the first end 124 of the rotor shaft 108. The coolant 130 may be directed across the inner surface 120 of the rotor shaft 108 and/or through a rotor cooling conduit 800, thereby transferring heat energy Q from the rotor assembly 104 (i.e., the rotor core 106 and/or the rotor shaft 108) to the coolant 130. The coolant 130 exits the second end of the rotor shaft 108, having been heated by the thermally conductive relationship with the inner surface 120 of the rotor shaft 108 and/or the inner surface of the rotor cooling conduit 800.

Coolant 130 discharging from the second end of the rotor shaft 108 flows through the cooling conduit 128 to the heat exchanger 904. The heat exchanger 904 defines at least a portion of the cooling conduit 128, providing a cooling surface 910 that has a thermally conductive relationship with coolant 130 flowing therethrough. The cooling surface 910 is configured to transfer heat energy Q from the coolant 130 to a heat sink fluid 912. The heat exchanger 904 may have any desired configuration suitable to transfer heat energy Q from the coolant 130 to the heat sink fluid 912. Suitable heat exchangers include shell and tube, plate and shell, and plate fin configurations, and the like. The heat exchanger 904 may be an external component or integrally formed within at least a portion of the housing assembly 110. The heat sink fluid 912 may be any desired fluid, including a liquid or a gas. Coolant passing through the heat exchanger 904 flows to the coolant reservoir 906, however in some embodiments a coolant reservoir 906 need not be provided. For example, the cooling conduit 128 may itself define a cooling reservoir 906. The coolant reservoir 906 may be an integral portion of the electric machine, or an external component.

In some embodiments, the heat sink fluid 912 may include an airflow that passes over a surface of the heat exchanger 904 and/or a surface of the cooling conduit 128. In some embodiments, the heat exchanger 904 may be an air-cooled oil cooler. Alternatively, or in addition, the heat exchanger 904 may include a surface of the housing assembly 110 across which the airflow passes. In some embodiments such as when the electric machine has been installed on an aircraft, the housing assembly 110 may take the form of a nacelle, and the heat sink fluid 912 may be airflow which passes over a surface of the nacelle.

The present disclosure additionally embraces methods of cooling an electric machine. Exemplary methods may include or utilize any of the features or embodiments described herein, including any combination thereof. The following exemplary methods and features thereof are provided by way of example and are not to be interpreted as limiting the present disclosure.

Figure 10:
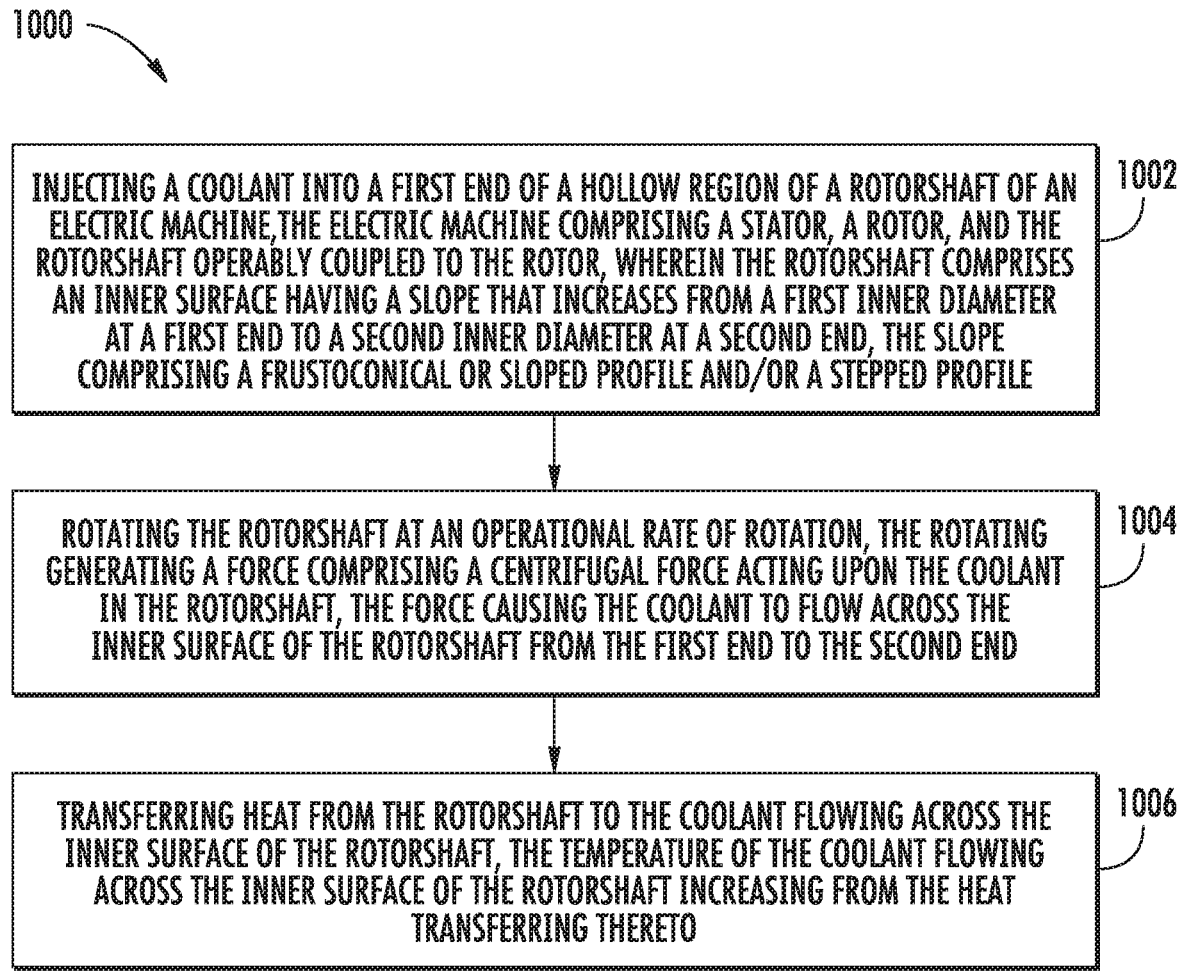
FIG. 10 is a flowchart depicting an exemplary method of cooling an electric machine with a liquid cooled rotor shaft.

FIG. 10 shows an exemplary method 1000 of cooling an electric machine. The exemplary method 1000 includes injecting 1002 a coolant 130 into a first end 124 of a hollow region 118 of a rotor shaft 108 of an electric machine 100. The electric machine 100 may be configured in accordance with the present disclosure, including any selection or combination of embodiments described herein. In the exemplary method 900, the electric machine includes a stator 102 and a rotor assembly 104. The rotor assembly 104 includes a rotor core 106 and a rotor shaft 108 operably coupled to the rotor core 106. The rotor shaft 108 includes an inner surface 120 having a slope $\theta$ that increases from a first inner diameter $D_1$ at a first end 124 to a second inner diameter $D_2$ at a second end 126. The slope $\theta$ may include a frustoconical or sloped profile and/or a stepped profile.

The exemplary method 900 continues with rotating 1004 the rotor shaft 108 at an operational rate of rotation, generating a force that includes a centrifugal force acting upon the coolant 130 in the rotor shaft 108, causing the coolant 130 to flow across the inner surface 120 of the rotor shaft 108 from the first end 124 to the second end 126. The coolant 130 flowing across the inner surface 120 of the rotor shaft 108 may form a film 136. The thickness of the film 136 and/or the velocity of the coolant 130 flowing across the inner surface 120 of the rotor shaft 108 depend at least in part on the slope $\theta$ of the inner surface 120 of the rotor shaft 108 and/or the rotating speed of the rotor shaft 108.

The exemplary method 900 additionally includes transferring heat 1006 from the rotor shaft 108 to the coolant 130 flowing across the inner surface 120 of the rotor shaft 108.

The temperature of the coolant 130 flowing across the inner surface 120 of the rotor shaft 108 increases from the heat transferring thereto.

In some embodiments, exemplary methods of cooling an electric machine 100 additionally may include discharging coolant from the second end of the rotor shaft 108, and directing the coolant through a heat exchanger 904, and transferring heat from the coolant 130 flowing through the heat exchanger 904 to a heat sink fluid 912. The temperature of the coolant 130 flowing through the heat exchanger 904 decreases from the heat transferring therefrom.

In some embodiments, exemplary methods of cooling an electric machine 100 may include scooping or pushing a coolant 130 through a plurality of coolant supply holes 408 and into a hollow region 118 of the rotor shaft 108 and/or into a rotor cooling conduit 800, with an impeller 134 such as described herein with reference to FIGS. 4A-4D and 5A-5D.

In some embodiments, exemplary methods of cooling an electric machine 100 may include selectively providing a slope θ of the inner surface 120 of the rotor shaft 108, so as to at least partially offset an expected change in the rate of heat transfer per unit area q due to an increasing temperature of the coolant 130 across the longitudinal length of the rotor shaft 108 with a proportional change in the annular surface area of the inner surface of the rotor shaft 108. Under certain operating conditions, the offset obtained by the selected slope θ may provide for a substantially uniform quantity of heat energy Q from the inner surface 120 of the rotor shaft 108 to the coolant 130 across a given length of the longitudinal axis of the rotor shaft 108 as between the first annular surface area $S_1$ and the second annular surface area $S_2$ on the inner surface of the rotor shaft 108. Additionally, or in the alternative, exemplary methods may include selectively providing a slope θ of the inner surface 120 of the rotor shaft 108, so as to at least in part provide a substantially uniform temperature and/or substantially uniform width of the air gap 140 across a longitudinal length of the rotor shaft 108 and/or rotor core 106 (e.g., as between the first region $R_1$ and the second region $R_2$).

Exemplary methods may additionally or alternatively include selectively providing a slope $θ_c$ so as to at least partially offset an expected change in the rate of heat transfer per unit area q due to an increasing temperature of the coolant 130 across the longitudinal length of the rotor shaft 108 with a proportional change in the annular surface area of the inner surface of the rotor shaft 108. Under certain operating conditions, the offset obtained by the selected slope θ may provide for a substantially uniform quantity of heat energy Q from the inner surface 802 of the rotor cooling conduit 800 to the coolant 130 across a given length of the longitudinal axis of the rotor shaft 108 as between the first annular surface area $S_1$ and the second annular surface area $S_2$ of the rotor cooling conduit 800. Further exemplary methods may include selectively providing a slope $θ_c$ of the rotor cooling conduit 800 so as to at least partially provide a substantially uniform temperature and/or substantially uniform width of the air gap 140 across a longitudinal length of the rotor shaft 108 and/or rotor core 106 (e.g., as between the first region $R_1$ and the second region $R_2$).

Various components of the electric machine 100 may be manufactured using any desired technology, including machining, drilling, casting, additive manufacturing, a combination thereof, or any other technique. By way of example, additive manufacturing process may be used to manufacture the rotor assembly 104 (e.g., the rotor core 106 and/or the rotor shaft 108) and/or the impeller 134. An additive manufacturing process may include any process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Binder Jetting (BJ), Material Jetting (MJ), Photopolymer Jetting (PJ), Sterolithography (SLA), Electron Beam Melting (EBM), Fused Deposition Modeling (FDM), Laser Engineered Net Shaping (LENS), Direct Metal Deposition (DMD), and Hybrid Processes (HP).

Any desired materials may be used to manufacture the components described herein. Exemplary materials include aluminum alloys, steel alloys, nickel alloys (e.g., superalloys), and composites such as ceramic matrix composite (CMC) materials. Exemplary CMC materials may include silicon carbide, silicon, silica, or alumina matrix materials and combinations thereof. Ceramic fibers may be embedded within the matrix, such as oxidation stable reinforcing fibers including monofilaments like sapphire and silicon carbide, yarn including silicon carbide, alumina silicates, and chopped whiskers and fibers, and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine comprising:
   a stator and a rotor;
   a rotor shaft operably coupled to the rotor, the rotor shaft comprising a hollow region configured to receive a coolant, the hollow region defined by an inner surface having a slope that increases from a first inner diameter at a first end to a second inner diameter at a second end; and
   an impeller comprising an annular body mounted on the rotor shaft, the rotor shaft fitting within an annular space defined by the annular body, the impeller comprising a plurality of impeller blades and a corresponding plurality of impeller channels transitioning from a radial orientation to an axial orientation, the plurality of impeller blades and the corresponding plurality of impeller channels configured to scoop or push the coolant through a plurality of coolant supply holes in the rotor shaft and into the first end of the hollow region of the rotor shaft;
   wherein a force comprising a centrifugal force generated when rotating the rotor shaft at an operating rate of rotation causes the coolant to flow across the inner surface of the rotor shaft from the first end to the second end at a velocity depending at least in part on the slope of the inner surface of the rotor shaft.

2. The electric machine of claim 1, wherein when operating the electric machine, the coolant forms a film on at least a portion of the inner surface of the rotor shaft, the thickness of the film depending at least in part on the slope of the inner surface of the rotor shaft, the flow rate of the coolant, and/or the viscosity of the coolant.

3. The electric machine of claim 1, wherein the thickness of the film is from 1 to 100 mils.

4. The electric machine of claim 1, wherein the slope of the inner surface of the rotor shaft comprises one or more of a linear slope or a nonlinear slope.

5. The electric machine of claim 1, wherein the slope of the inner surface of the rotor shaft comprises a first slope located at a first point on a longitudinal axis of the rotor shaft, and a second slope located at a second point on the longitudinal axis of the rotor shaft, the first slope being greater than the second slope.

6. The electric machine of claim 1, wherein the slope of the inner surface of the rotor shaft is greater than 0° and less than 90° relative to a longitudinal axis of the rotor shaft.

7. The electric machine of claim 1, wherein at least a portion of the inner surface of the rotor shaft has one or more grooves or ridges thereon, the one or more grooves or ridges having a depth or height and a transverse angular orientation relative to a longitudinal axis of the rotor shaft, wherein the velocity of the coolant flowing across the inner surface of the rotor shaft depends at least in part on the depth or height and/or the angular orientation of the one or more grooves or ridges.

8. The electric machine of claim 7, wherein the angular orientation comprises a spiral orientation.

9. The electric machine of claim 1, wherein the impeller comprises a bi-directional impeller, the bi-directional impeller comprising a first plurality of impeller blades and a corresponding first plurality of impeller channels transitioning from a radial orientation to a first axial orientation, the first plurality of impeller blades and the corresponding first plurality of impeller channels configured to scoop or push the coolant through the plurality of coolant supply holes in the rotor shaft and into the first end of the rotor shaft, and a second plurality of impeller blades and corresponding second plurality of impeller channels transitioning from a radial orientation to a second axial orientation, the second plurality of impeller blades and the corresponding second plurality of impeller channels configured to scoop or push the coolant through a cooling conduit defining a pathway that circulates the coolant past a bearing assembly mounted on the rotor shaft.

10. The electric machine of claim 1, further comprising:
an annular coolant dam traversing the perimeter of the inner surface of the rotor shaft at the first end thereof, wherein the force comprises a longitudinal force induced by the annular coolant dam.

11. The electric machine of claim 10, wherein the annular coolant dam comprises a rubber or elastomeric ring fitted into an annular groove formed on the inner surface of the rotor shaft.

12. The electric machine of claim 1, further comprising:
an annular coolant dam traversing the perimeter of the inner surface of the rotor shaft at the second end thereof, the annular coolant dam having a height relative to the inner surface, wherein the coolant forms a film on at least a portion of the inner surface of the rotor shaft, the thickness of the film depending at least in part on the height of the annular coolant dam.

13. The electric machine of claim 1, wherein the first end of the rotor shaft comprises a first lateral end and a plurality of coolant supply holes formed in the first lateral end each defining a pathway for the coolant to flow through the first lateral end and into the rotor shaft.

14. The electric machine of claim 1, wherein the second end of the rotor shaft comprises a second lateral end and a plurality of coolant discharge holes formed in the second lateral end each defining a pathway for the coolant to flow through the second lateral end and out of the rotor shaft, the discharge holes having an axial, angled, and/or radial orientation.

15. The electric machine of claim 1, further comprising:
a rotor cooling conduit integrally formed within the body of the rotor shaft, the rotor cooling conduit defining a pathway for circulating the coolant through the body of the rotor shaft, the rotor cooling conduit having a transverse angular orientation relative to a longitudinal axis of the rotor shaft, wherein the velocity of the coolant flowing through the rotor cooling conduit depends at least in part on the angular orientation of the rotor cooling conduit and/or the slope of the slope of the inner surface of the rotor shaft.

16. The electric machine of claim 15, wherein the rotor cooling conduit has a spiral orientation.

17. A method of cooling an electric machine, the method comprising:
injecting a coolant into a first end of a hollow region of a rotor shaft of an electric machine;
rotating the rotor shaft at an operational rate of rotation, the rotating generating a force comprising a centrifugal force acting upon the coolant in the rotor shaft, the force causing the coolant to flow across an inner surface of the rotor shaft from the first end to a second end; and
transferring heat from the rotor shaft to the coolant flowing across the inner surface of the rotor shaft;
wherein the electric machine comprising a stator, a rotor, an impeller comprising an annular body mounted on the rotor shaft, the rotor shaft fitting within an annular space defined by the annular body, and the rotor shaft operably coupled to the rotor, wherein the inner surface of the rotor shaft has a slope that increases from a first inner diameter at the first end to a second inner diameter at the second end, the slope comprising a frustoconical or sloped profile and/or a stepped profile; and
wherein the impeller comprises a plurality of impeller blades and a corresponding plurality of impeller channels transitioning from a radial orientation to an axial orientation, the plurality of impeller blades and the corresponding plurality of impeller channels configured to scoop or push the coolant through a plurality of coolant supply holes in the rotor shaft and into the first end of the hollow region of the rotor shaft.

18. The method of claim 17, wherein the slope of the inner surface of the rotor shaft is selected at least in part to provide a substantially uniform temperature as between a first region of the rotor shaft and/or rotor and a second region of the rotor shaft and/or rotor.

19. The method of claim 17, wherein the slope of the inner surface of the rotor shaft is selected at least in part to transfer a substantially uniform quantity of heat energy from the rotor shaft to the coolant across a given length of the longitudinal axis of the rotor shaft, as between a first annular surface area on the inner surface of the rotor shaft and a second annular surface area on the inner surface of the rotor shaft.

20. The electric machine of claim 1, comprising:
one or more nozzles configured to supply the coolant to the impeller, the one or more nozzles located radially adjacent to the impeller.

* * * * *